United States Patent
Chen et al.

(10) Patent No.: US 11,937,337 B2
(45) Date of Patent: Mar. 19, 2024

(54) METHODS AND APPARATUSES FOR ALTERNATIVE DATA OVER NON-ACCESS STRATUM, DONAS, DATA DELIVERY IN A ROAMING SCENARIO

(71) Applicant: Telefonaktiebolaget LM Ericsson (publ), Stockholm (SE)

(72) Inventors: Qian Chen, Mölndal (SE); Hans Bertil Rönneke, Kungsbacka (SE); Yong Yang, Kållered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 345 days.

(21) Appl. No.: 17/430,561

(22) PCT Filed: Oct. 17, 2019

(86) PCT No.: PCT/EP2019/078181
§ 371 (c)(1),
(2) Date: Aug. 12, 2021

(87) PCT Pub. No.: WO2020/164763
PCT Pub. Date: Aug. 20, 2020

(65) Prior Publication Data
US 2022/0132295 A1   Apr. 28, 2022

Related U.S. Application Data

(60) Provisional application No. 62/805,095, filed on Feb. 13, 2019.

(51) Int. Cl.
*H04W 8/18* (2009.01)
*H04W 76/12* (2018.01)

(52) U.S. Cl.
CPC ............ *H04W 8/18* (2013.01); *H04W 76/12* (2018.02)

(58) Field of Classification Search
CPC ................................ H04W 8/18; H04W 76/12
See application file for complete search history.

(56) References Cited

U.S. PATENT DOCUMENTS

2019/0028860 A1    1/2019  Futaki et al.
2019/0116229 A1*   4/2019  Shi ....................... H04L 67/143
(Continued)

OTHER PUBLICATIONS

Author Unknown, "Technical Specification Group Services and System Aspects; Study on Cellular Internet of Things (IoT) support and evolution for the 5G system (Release 16)," Technical Report 23.724, Version 16.0.0, 3GPP Organizational Partners, Dec. 2018, 276 pages.

(Continued)

*Primary Examiner* — Barry W Taylor
(74) *Attorney, Agent, or Firm* — Withrow & Terranova, PLLC

(57) ABSTRACT

A method in a core network of a cellular communications system to enable Data over Non-Access Stratum, DoNAS, data delivery in a roaming scenario, the method comprising: sending from the V-SMF to a Home Session Management Function, H-SMF, a Packet Data Unit, PDU, session create request during PDU session establishment for DoNAS data delivery for a User Equipment, UE, in a roaming scenario; and receiving a response from the H-SMF. In embodiments of the method the PDU session create request comprises an indication that a control plane can be used for data delivery.

10 Claims, 14 Drawing Sheets

PDU Session Establishment enabling Data over NAS-SM via NEF (home-routed roaming) with CP data between V-SMF and H-SMF

(56) References Cited

U.S. PATENT DOCUMENTS

| | | | | |
|---|---|---|---|---|
| 2020/0314922 A1* | 10/2020 | Zhu | ............... | H04W 4/70 |
| 2022/0132455 A1* | 4/2022 | Gupta | ............... | H04W 60/00 |
| 2023/0132454 A1* | 5/2023 | Kim | ............... | H04L 12/1407 |
| | | | | 370/329 |

OTHER PUBLICATIONS

Author Unknown, "Technical Specification Group Services and System Aspects; System Architecture for the 5G System; Stage 2 (Release 15)," Technical Specification 23.501, Version 15.4.0, 3GPP Organizational Partners, Dec. 2018, 236 pages.

Author Unknown, "Technical Specification Group Services and System Aspects; Procedures for the 5G System; Stage 2 (Release 15)," Technical Specification 23.502, Version 15.4.0, 3GPP Organizational Partners, Dec. 2018, 346 pages.

Author Unknown, "Technical Specification Group Services and System Aspects; Procedures for the 5G System; Stage 2 (Release 16)," Technical Specification 23.502, Version 16.1.1, 3GPP Organizational Partners, Jun. 2019, 495 pages.

Author Unknown, "Technical Specification Group Services and System Aspects; Policy and Charging Control Framework for the 5G System; Stage 2 (Release 15)," Technical Specification 23.503, Version 15.4.0, 3GPP Organizational Partners, Dec. 2018, 76 pages.

Author Unknown, "Technical Specification Group Core Network and Terminals; 5G System; Session Management Services; Stage 3 (Release 15)," Technical Specification 29.502, Version 15.2.1, 3GPP Organizational Partners, Dec. 2018, 144 pages.

Author Unknown, "Technical Specification Group Services and System Aspects; Telecommunication management; Charging management; Charging architecture and principles (Release 15)," Technical Specification 32.240, Version 15.4.0, 3GPP Organizational Partners, Dec. 2018, 60 pages.

Author Unknown, "Technical Specification Group Services and System Aspects; Telecommunication management; Subscriber and equipment trace; Trace concepts and requirements (Release 15)," Technical Specification 32.421, Version 15.0.0, 3GPP Organizational Partners, Jun. 2018, 45 pages.

Author Unknown, "Technical Specification Group Services and System Aspects; Security architecture and procedures for 5G System (Release 15)," Technical Specification 33.501, Version 15.3.1, 3GPP Organizational Partners, Dec. 2018, 181 pages.

Huawei, et al., "S2-1901310: Introduction of small data transfer in Control Plane CIoT 5GS Optimisation," Third Generation Partnership Project (3GPP), TSG-SA WG2 Meeting #130, Jan. 21-25, 2019, 22 pages, Kochi, India.

Huawei, et al., "S2-1901726: Introduction of small data transfer in Control Plane CIoT 5GS Optimisation," Third Generation Partnership Project (3GPP), TSG-SA WG2 Meeting #131, Feb. 25-Mar. 1, 2019, 23 pages, Santa Cruz, Tenerife, Spain.

International Search Report and Written Opinion for International Patent Application No. PCT/EP2019/078181, dated Mar. 11, 2020, 17 pages.

International Preliminary Report on Patentability for International Patent Application No. PCT/EP2019/078181, dated May 19, 2021, 21 pages.

\* cited by examiner

PDU Session Establishment enabling Data over NAS-SM via NEF (home-routed roaming) with CP data between V-SMF and H-SMF PDU Session Establishment enabling Data over NAS-SM via NEF (home-routed roaming) with UP data between V-SMF and H-SMF Figure 6.30.1.2.2-1 of TR 23.724, V16.0.0: Simplified Service Based Architecture for small data delivery via NEF (roaming with home routed scenario)

Figure 6.30.4.2-1 of TR 23.724, V16.0.0: PDU Session Establishment enabling Data over NAS-SM via NEF (home-routed roaming)

Figure 4.3.2.2.1-1 of 23.502 V16.1.1: UE-requested PDU Session Establishment for non-roaming and roaming with local breakout Figure 4.3.2.2.2-1 of 23.502 V16.1.1: UE-requested PDU Session Establishment for home-routed roaming scenarios Figure 4.x.1-1: UPF anchored Mobile Originated Data Transport in Control Plane CIoT 5GS Optimisation Figure 4.x.2-1: Mobile Terminated Data Transport in Control Plane CIoT 5GS Optimisation

METHODS AND APPARATUSES FOR ALTERNATIVE DATA OVER NON-ACCESS STRATUM, DONAS, DATA DELIVERY IN A ROAMING SCENARIO

This application is a 35 U.S.C. § 371 national phase filing of International Application No. PCT/EP2019/078181, filed Oct. 17, 2019, which claims the benefit of Provisional Application No. 62/805,095, filed Feb. 13, 2019, the disclosures of which are incorporated herein by reference in their entireties.

TECHNICAL FIELD

The present disclosure relates to a method for enabling Data over Non-Access Stratum (DoNAS) data delivery and to a Session Management Function (SMF) for performing the method in a core network of a cellular communications system.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

The Third Generation Partnership Project (3GPP) has an Internet of Things (IoT) study item for the Fifth Generation (5G) System (5GS) through Technical Report (TR) 23.724. In TR 23.724, Solution 30 is recommended for normative work for Data of Non-Access Stratum (DoNAS) data delivery through the Network Exposure Function (NEF).

The solution covers both non-roaming and roaming case. The roaming architecture/procedure as shown in FIG. 11 is in an excerpt from TR 23.724, V16.0.0.
6.30 Solution 30: NEF Based Infrequent Small Data Transfer Via NAS-SM
6.30.1.2.2 Roaming Reference Architectures
  See FIG. 11.
  Figure 6.30.1.2.2-1: Simplified Service Based Architecture for Small Data Delivery Via NEF (Roaming with Home Routed Scenario)
6.30.4.2 PDU Session Establishment (Home-Routed Roaming)
This procedure takes the PDU Session Establishment procedure as described in TS 23.502 [7], shown in FIG. 12, subclause 4.3.2.2.2 as the baseline.
  See FIG. 12.
  Figure 6.30.4.2-1: PDU Session Establishment enabling Data over NAS-SM via NEF (home-routed roaming)
  1. The UE sends a PDU session establishment request message as SM payload of a NAS transport message. The NAS transport message contains PDU session ID along with other regular information e.g. DNN, S-NSSAI, etc. if applicable.
  2. The AMF determines if the PDU Session uses NAS-SM to transfer PDUs. If the PDU Session will use NAS-SM to transfer PDUs, the AMF selects an SMF that supports Data over NAS-SM if available for the requested DNN, and S-NSSAI. The AMF stores the association of the PDU Session ID and the selected SMF ID in the UE context.
  NOTE 1: How the AMF determines if the PDU Session uses NAS-SM to transfer PDUs will be determined as part of the Key Issue 15 conclusion.
  3. The AMF invokes Nsmf_PDUSession_CreateSMContext request including DNN, S-NSSAI, PDU Session ID. The V-SMF replies with an Nsmf_PDUSession_CreateSMContext Response. The AMF also indicates to the V-SMF if the PDU Session uses NAS-SM to transfer PDUs.
  4. The V-SMF sends the Nsmf_PDUSession_CreateSMContext request to the H-SMF. The V-SMF also indicates to the H-SMF if the PDU Session uses NAS-SM to transfer PDUs.
  5. The H-SMF registers with the UDM and retrieves the Session Management Subscription data for the corresponding SUPI, DNN and S-NSSAI. If the subscription includes an Invoke NEF Selection indication for the DNN and S-NSSAI indicated by UE, the H-SMF informs the V-SMF to transfer data to the DN via NEF.
  6. The H-SMF responds to the V-SMF.
  7. The V-SMF configures the NEF via the IWK-NEF for data transfer.
  8. The V-SMF sends a PDU Session Establishment Accept providing indication that Data Over NAS-SM is enabled for this PDU session without including the N2 SM container.
  9. The AMF forwards the NAS message to the UE.

There currently exist certain challenge(s). The proposed Solution 30 in the TR 23.724 describes that, in case of roaming, the Visited Session Management Function (V-SMF) signals with the Home Session Management Function (H-SMF) as a normal Packet Data Unit (PDU) session establishment procedure. Then, based on the information received from UDM (related to NEF/Non-Internet Protocol (IP) Data Delivery (NIDD)), the H-SMF returns NEF/NIDD related information to the V-SMF. The V-SMF then establishes a connection with the NEF (through an Interworking NEF (IWF-NEF) if that option is used) to establish a DoNAS data delivery path.

This means that two NFs in the Visited Public Land Mobile Network (VPLMN) (i.e., the V-SMF and IWF-NEF) and two NFs in the Home Public Land Mobile Network (HPLMN) (i.e., the H-SMF and NEF) are involved in the establishment of a data delivery path. Also, it is not clear what the role of H-SMF is besides providing the NEF/NIDD related information to V-SMF. Further, the V-SMF needs to manage resources created both in the H-SMF and the NEF/IWF-NEF for one PDU session, which is unnecessarily complicated.

SUMMARY

Certain aspects of the present disclosure and their embodiments may provide solutions to the aforementioned or other challenges. Systems and methods for DoNAS data delivery are proposed that provide solutions to the aforementioned or other challenges.

In some embodiments, the following improvements are provided to simply the architecture and handling in both V-SMF and H-SMF for establishing a DoNAS data delivery path without using IWF-NEF.

1) In some embodiments, the H-SMF is added to the path of DoNAS data delivery. The H-SMF can then more easily handle resources in the HPLMN, than the V-SMF can from the VPLMN. In other words, it is possible to deliver DoNAS data between the V-SMF and the H-SMF through the control plane (i.e. N16 interface, or N32 with service based architecture). The V-SMF is responsible for packaging and/or unpackaging the data into and/or from a NAS message exchanged with the UE. In an alternative embodiment, the H-SMF does the packaging/unpacking.

2) In some other embodiments, the H-SMF requests the V-SMF to send the DoNAS data using the user plane between VPLMN and HPLMN over the roaming interface (e.g., N9 interface between Visited User Plane Function (V-UPF) and Home User Plane Function (H-UPF)) based on HPLMN policy.

More specifically, during PDU session establishment for DoNAS, the H-SMF decides it prefers a user plane as roaming interface for DoNAS data (the H-SMF e.g. has decided to use the N6 interface for connecting the UE to internet, or the H-SMF may be configured with a roaming policy to use User Plane (UP) data delivery). The H-SMF then indicates to the V-SMF to use UP data delivery (instead of Control Plane (CP) data delivery in 1) above) in the PDU session establishment procedure. The indication can either be the absence of the "Indication to use CP data for roaming" indicator (and, e.g., inclusion of the UP N9 tunnel information) or alternatively by an explicit indicator, which may be called "Indication to use UP data for roaming". If UP data delivery has been indicated, the V-SMF selects a V-UPF and establishes a connection between V-UPF and H-UPF, e.g., based on tunnel information received by the V-SMF from the H-SMF.

Note: Regardless of how the H-SMF receives data from the V-SMF (either N16 or N9 interface), it can decide separately if a H-UPF path (e.g., N6) or a NEF path (e.g., NIDD Application Program Interface (API)) shall be used for data delivery with the Application Function (AF), Service Capability Server (SCS), or Access Stratum (AS).

Embodiments of the present disclosure provide updated aspects for DoNAS data delivery for the roaming case. Embodiments of the present disclosure decouple dependencies between VPLMN and HPLMN by using a H-SMF for NEF selection and data transmission. Basically, it is transparent to VPLMN if HPLMN uses a NEF (e.g., NIDD API) or H-UPF (e.g., N6 interface) to connect to internet.

In some embodiments, information used to select and establish a connection to the internet (e.g., between NEF (e.g., NIDD API) delivery or UPF (e.g., N6) delivery) is retrieved by H-SMF from Unified Data Management (UDM) and used by the H-SMF instead of sending it to the VPLMN's V-SMF. That would have caused a Session Management—Mobility Management layer conflict and caused unnecessary ping-pong of information between HPLMN and VPLMN.

In some embodiments, the HPLMN can, based on policies, chose to use the UP interface (e.g., N9 interface) instead of CP interface (e.g., N16 or N32 interface) for DoNAS delivery in roaming cases.

There are, proposed herein, various embodiments which address one or more of the issues disclosed herein.

Certain embodiments may provide one or more of the following technical advantage(s):

1) Single NF, i.e. V-SMF, in VPLMN during the PDU session establishment for DoNAS data delivery.
2) Simple logic in V-SMF and H-SMF to handle uplink and downlink data since the handling is rather similar to the non-roaming case
3) Possible to have decoupled control logics in VPLMN and HPLMN regarding how the data is to be delivered between the two Public Land Mobile Networks (PLMNs) when DoNAS is used between the User Equipment device (UE) and V-SMF.
4) Both CP data delivery (e.g., through N16 interface) and UP data delivery (e.g., through N9 interface) are possible for roaming interface to deliver DoNAS data.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
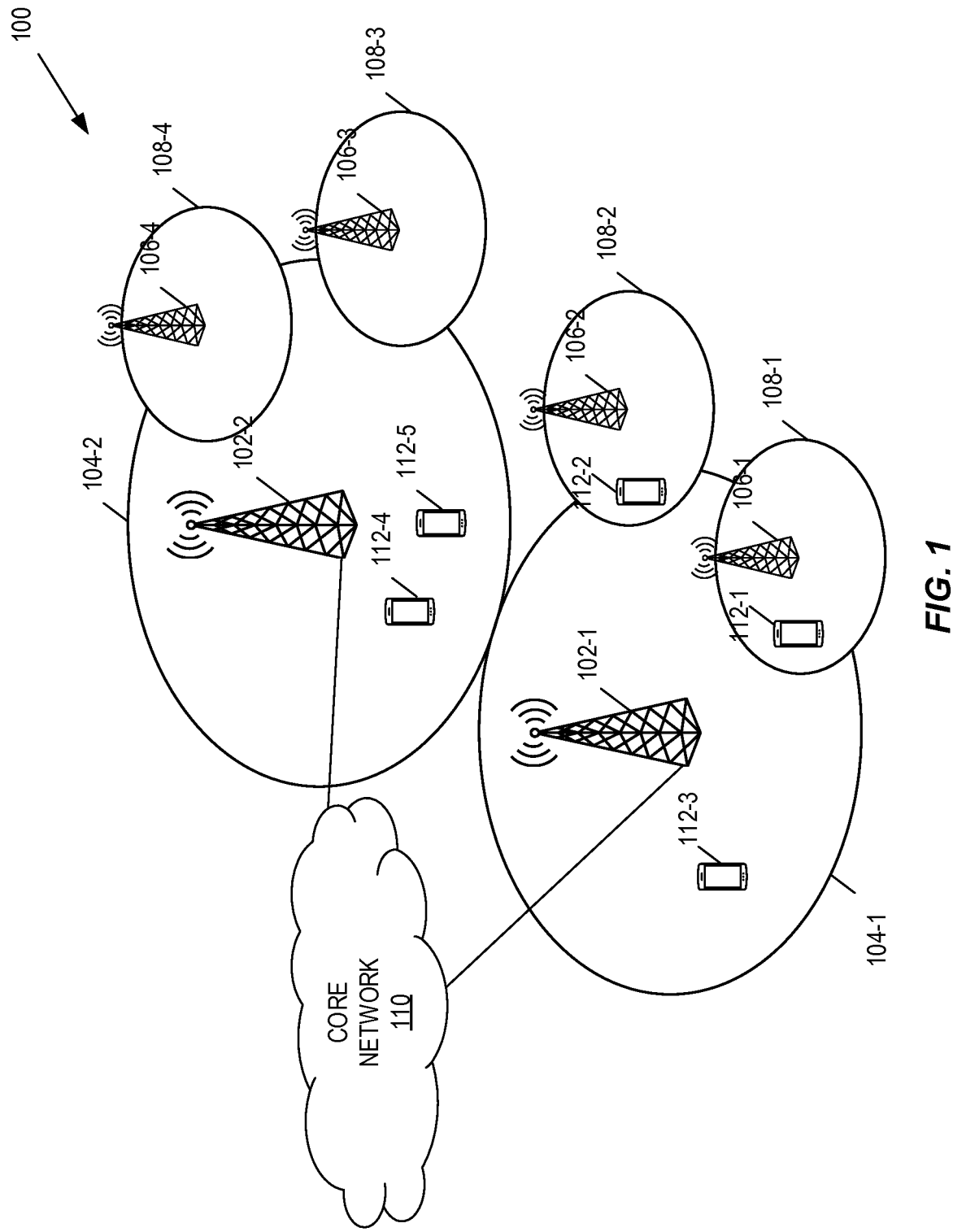
FIG. 1 illustrates one example of a cellular communications network in which embodiments of the present disclosure may be implemented.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix, i.e. draft contribution with CR #0971r4 on 23.502 with all text marked with turquoise color implementing some parts of present disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a 3GPP 5G NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Entity: As used herein, a "core network entity" is any type of entity in a core network. Some examples of a core network entity include, e.g., a Mobility Management Entity (MME), a Packet Data Network Gateway (P-GW), a Service Capability Exposure Function (SCEF), or the like in an Evolved Packet Core (EPC). Some other examples of a core network entity include, e.g., an Access and Mobility Management Function (AMF), a Network Slice Selection Function (NSSF), an Authentication Server Function (AUSF), a UDM, a Session Management Function (SMF), a Policy Control Function (PCF), an AF, a NEF, a User Plane Function (UPF), or the like in a 5G Core (5GC). A core network entity may be implemented as a physical network node (e.g., including hardware or a combination of hardware and software) or implemented as a functional entity (e.g., as software) that is, e.g., implemented on a physical network node or distributed across two or more physical network nodes.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a UE in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Systems and methods for DoNAS delivery are disclosed herein.

In this regard, FIG. 1 illustrates one example of a cellular communications network 100 in which embodiments of the present disclosure may be implemented. In the embodiments described herein, the cellular communications network 100 is a 5G System (5GS) including a 5G radio access network (e.g., a NR radio access network) and a 5GC; however, the present disclosure is not limited thereto. In this example, the cellular communications network 100 includes base stations 102-1 and 102-2, which in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110. For a 5GS, the core network 110 is a 5GC.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

Figure 2:
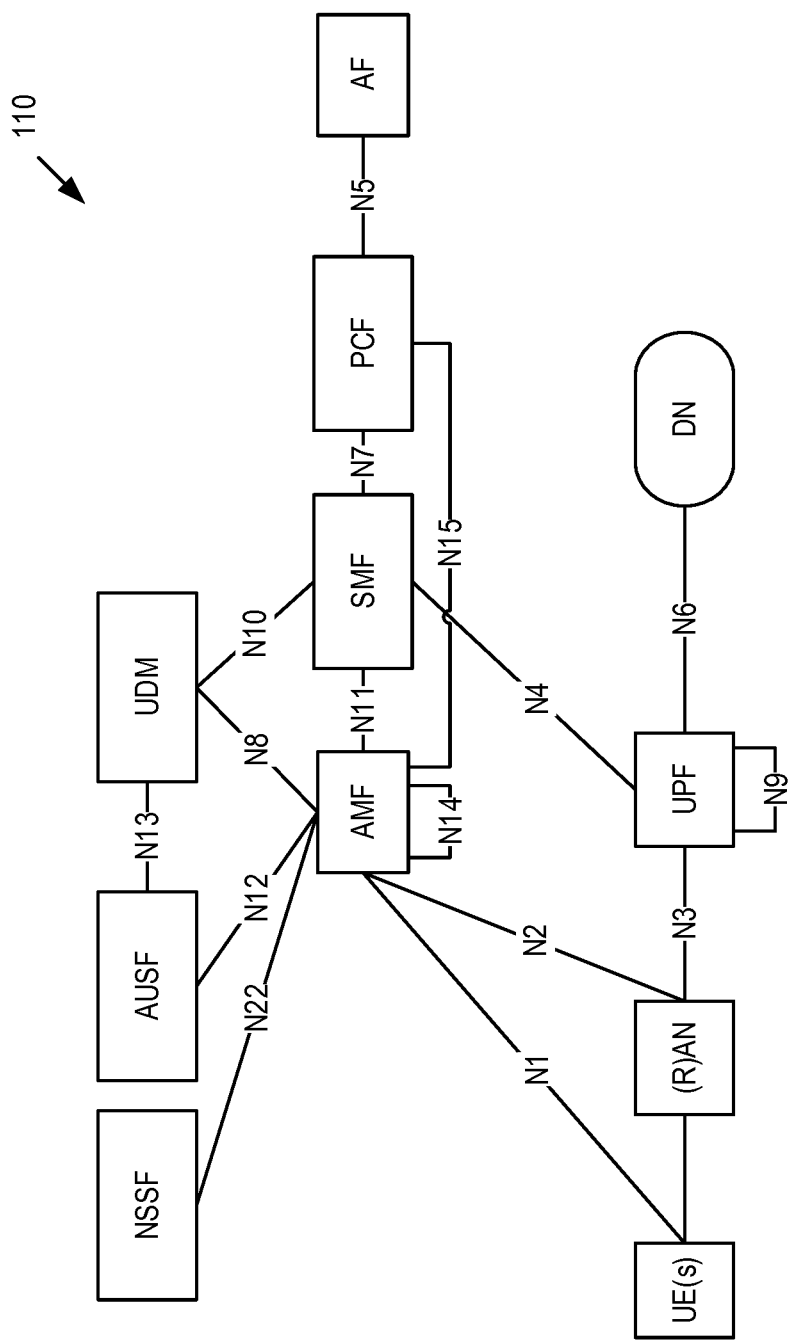
FIG. 2 illustrates a wireless communication system represented as a Fifth Generation (5G) network architecture composed of core Network Functions (NFs), where interaction between any two NFs is represented by a point-to-point reference point/interface.

FIG. 2 illustrates a wireless communication system represented as a 5G network architecture composed of core Network Functions (NFs), where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of UEs connected to either a Radio Access Network (RAN) or an Access Network (AN) as well as an AMF. Typically, the R(AN) comprises base stations, e.g. such as eNBs or gNBs or similar. Seen from the core network side, the 5G core NFs shown in FIG. 2 include a NSSF, an AUSF, a UDM, an AMF, a SMF, a PCF, and an AF.

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 2, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 3:
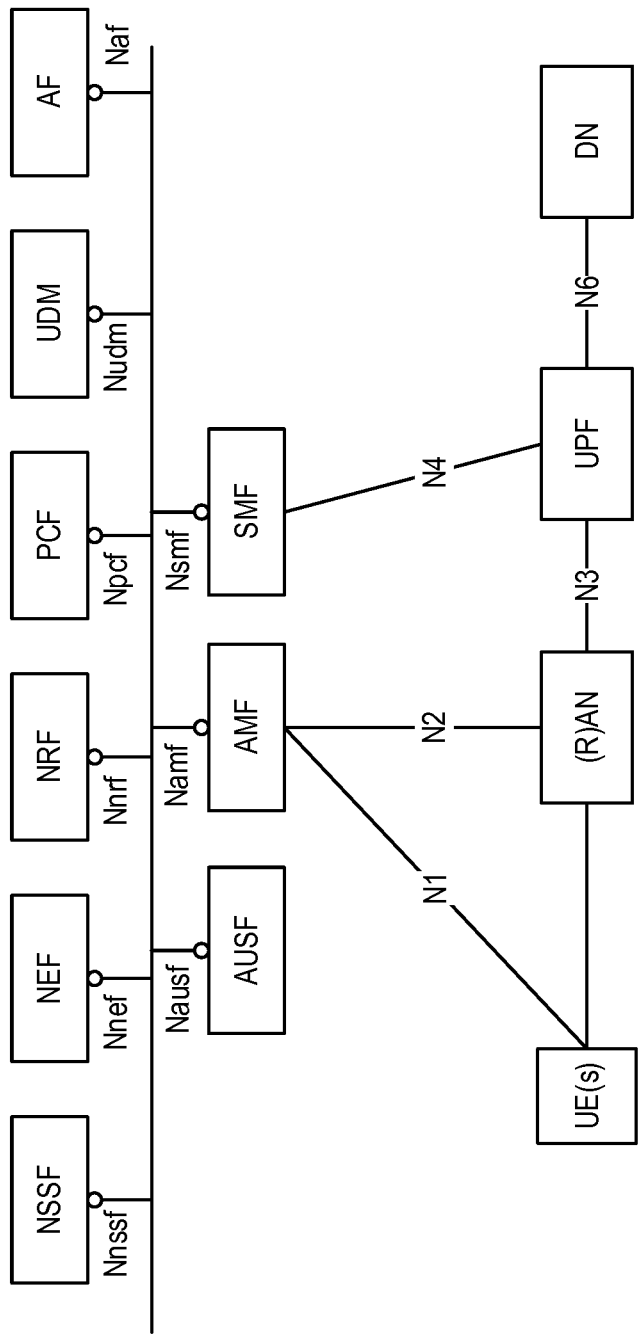
FIG. 3 illustrates a 5G network architecture using service-based interfaces between the NFs in the control plane, instead of the point-to-point reference points/interfaces used in the 5G network architecture of FIG. 2.

FIG. 3 illustrates a 5G network architecture using service-based interfaces between the NFs in the control plane, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF and Nsmf for the service based interface of the SMF etc. The NEF and the Network Repository Function (NRF) in FIG. 3 are not shown in FIG. 2 discussed above. However, it should be clarified that all NFs depicted in FIG. 2 can interact with the NEF and the NRF of FIG. 3 as necessary, though not explicitly indicated in FIG. 2.

Some properties of the NFs shown in FIGS. 2 and 3 may be described in the following manner. The AMF provides UE-based authentication, authorization, mobility management, etc. A UE even using multiple access technologies is basically connected to a single AMF because the AMF is independent of the access technologies. The SMF is responsible for session management and allocates IP addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 4:
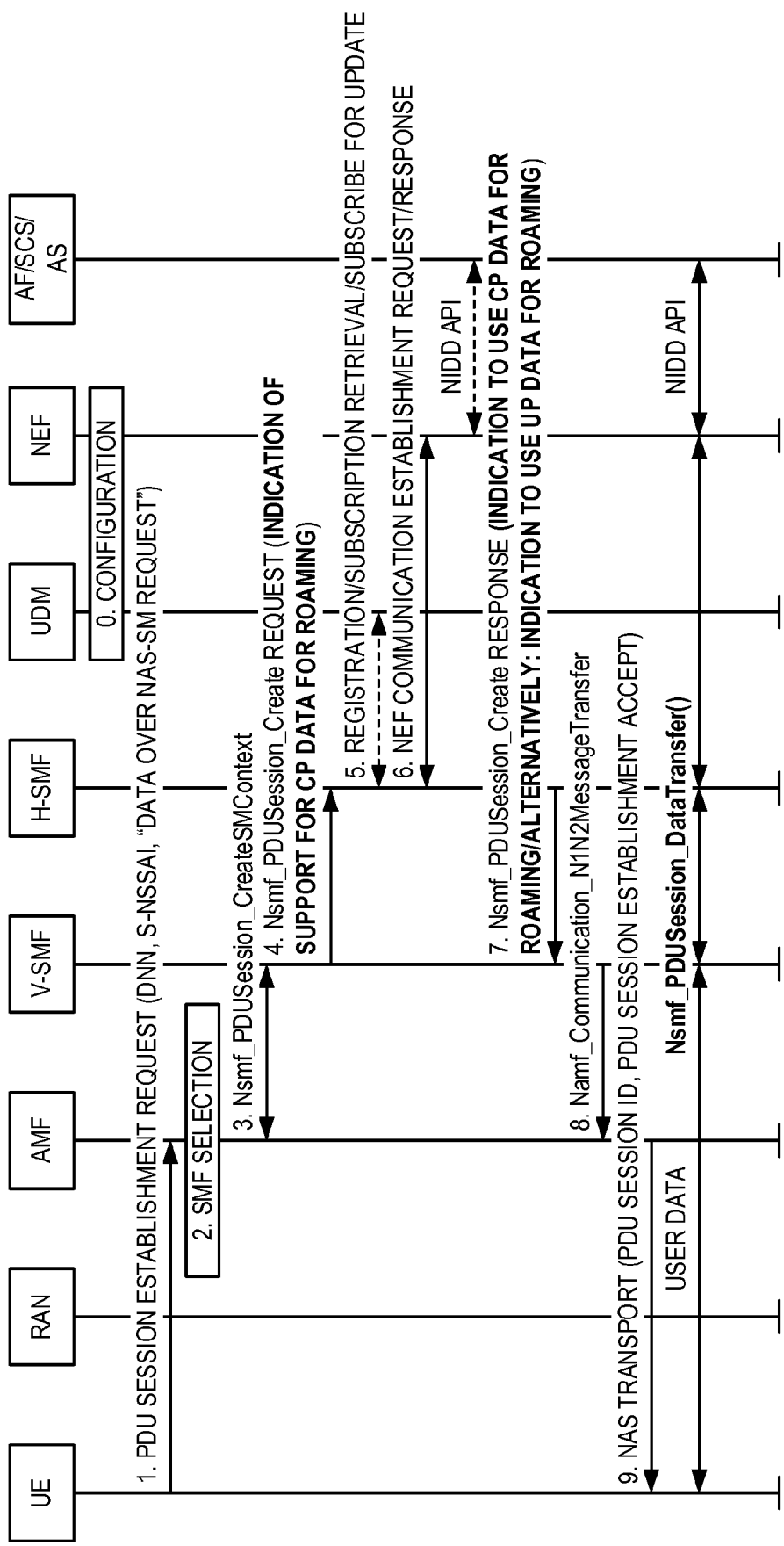
FIG. 4 illustrates a procedure for establishing a Data over Non-Access Stratum (DoNAS) data delivery path for a roaming scenario in accordance with some embodiments of the present disclosure.
Figure 5:
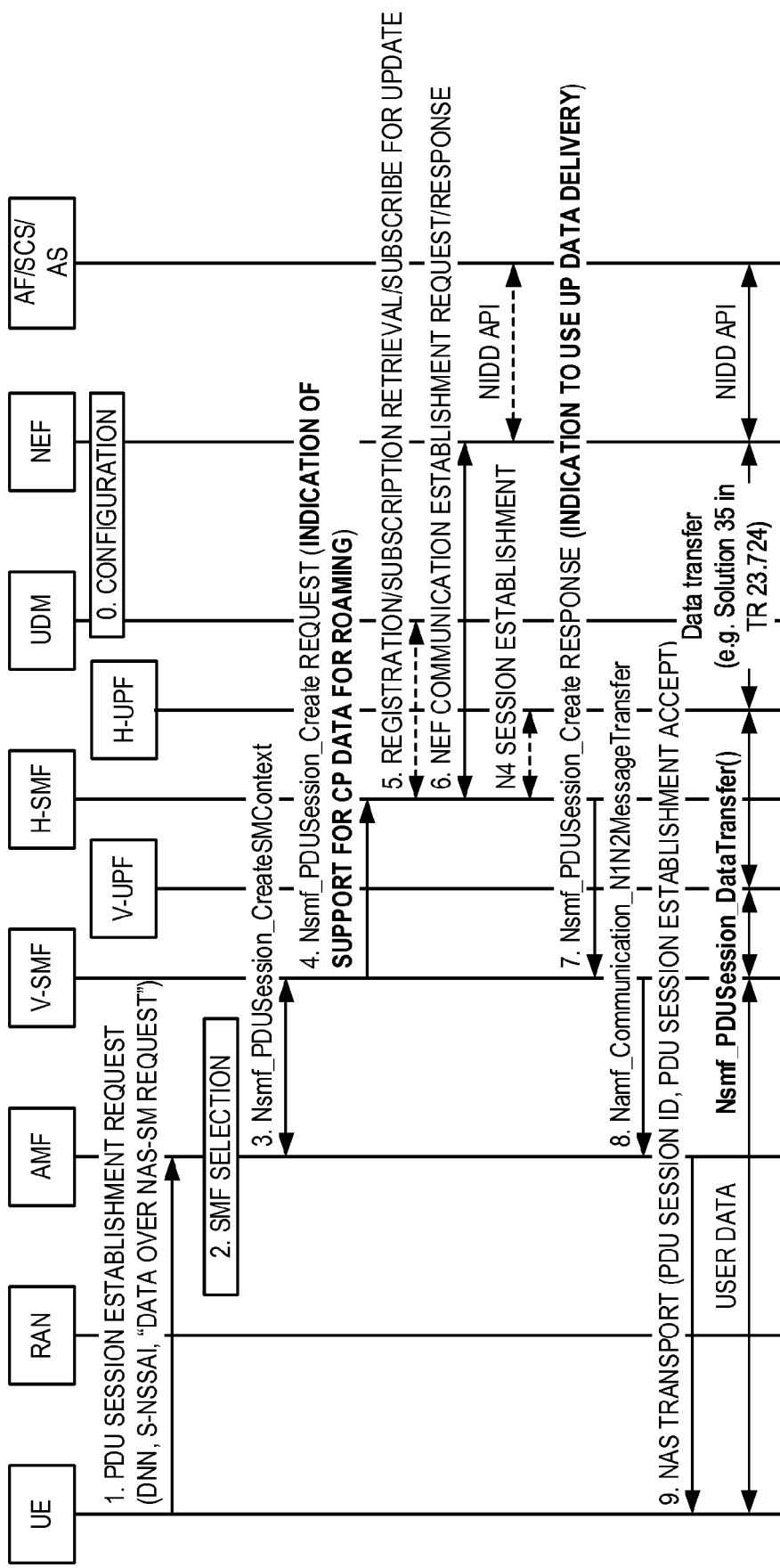
FIG. 5 illustrates a procedure for establishing a DoNAS data delivery path for a roaming scenario in accordance with some other embodiments of the present disclosure.

FIG. 4 illustrate a procedure for establishing a DoNAS data delivery path for a roaming scenario in accordance with some embodiments of the present disclosure. In particular, FIG. 4 illustrates a PDU session establishment procedure enabling DoNAS data delivery via the NEF for home-routed roaming with CP data delivery between V-SMF and H-SMF in accordance with some embodiments of the present disclosure. FIG. 5 illustrates a procedure for establishing a DoNAS data delivery path for a roaming scenario in accordance with some other embodiments of the present disclosure. In particular, FIG. 5 illustrates a PDU session establishment procedure enabling DoNAS data delivery via the NEF for home-routed roaming with UP data delivery between V-SMF and H-SMF in accordance with some other embodiments of the present disclosure. Note that bold text is used in FIGS. 4 and 5 to highlight at least some new aspects of this procedure.

The steps of FIGS. 4 and 5 can be described as follows:
1. The UE sends, to the AMF, a PDU session establishment request message as SM payload of a NAS transport message. The NAS transport message contains a PDU session ID along with other regular information e.g. Data Network Name (DNN), Single Network Slice Selection Assistance Information (S-NSSAI), etc., if applicable.
2. The AMF determines if the PDU Session uses NAS-SM to transfer PDUs. If the PDU Session will use NAS-SM to transfer PDUs, the AMF selects a V-SMF that supports Data over NAS-SM if available for the requested DNN and S-NSSAI. The AMF stores the association of the PDU Session Identifier (ID) and the SMF ID of the selected V-SMF in the UE context. The AMF also selects a H-SMF that supports SMF-NEF communication if the AMF has NEF selection information available in UE subscription data
3. The AMF sends, to the V-SMF, an Nsmf_PDUSession_CreateSMContext request including DNN, S-NSSAI, PDU Session ID, and H-SMF ID. The V-SMF replies to the AMF with a Nsmf_PDUSession_CreateSMContext Response. The AMF also indicates to the V-SMF if the PDU Session uses NAS-SM to transfer PDUs.
4. The V-SMF sends an Nsmf_PDUSession_Create request to the H-SMF. The V-SMF also indicates to the H-SMF if the PDU Session uses NAS-SM to transfer PDUs. In some embodiments, the V-SMF also indicates if control plane can be used for data delivery in this roaming situation (e.g., based on local V-SMF policy). In some embodiments, this indication if the control plane can be used for data delivery is this roaming situation is included in the Nsmf_PDUSession_Create request, as illustrated in the example of FIG. 4. In the example of FIG. 4, control plane can be used for delivery. Alternatively, as an example, the V-SMF and the H-SMF may negotiate (e.g., previously) or agreed (e.g., previously) to use CP (or alternatively to use UP) for DoNAS data delivery, in which case no indication of whether CP is to be used (or alternatively UP is to be used) is needed in the Nsmf_PDUSession_Create request.

5. The H-SMF registers with the UDM and retrieves the Session Management Subscription data for the corresponding Subscriber Permanent Identifier (SUPI), DNN, and S-NSSAI. If the subscription includes an Invoke NEF Selection indication, and also other information such as Invoke NIDD API indication for the DNN and S-NSSAI indicated by UE, the H-SMF informs the V-SMF to transfer data to the DN via NEF.
6. Based on information received from UDM in step 5, the H-SMF establish the connection with NEF for data transfer. The NEF may also trigger a NIDD configuration towards AF.
7. The H-SMF responds to V-SMF and indicates the use of control plane data delivery over the roaming interface, in the example process of FIG. 4.
    As illustrated in FIG. 5, the alternative to control plane data delivery between V-SMF and H-SMF as in the example of FIG. 4 is user plane data delivery. The H-SMF may prefer user plane data delivery based on, e.g., local policy or roaming agreement between the two PLMNs. As illustrated in FIG. 5, if user plane data delivery is selected, the H-SMF triggers H-UPF selection and allocation of the N9 uplink tunnel information through an N4 Session establishment procedure. The H-SMF indicates the use of user plane as roaming interface back to V-SMF by providing "use of user plane data delivery" indicator (or by absence of the "use of control plane data delivery" indicator) and providing the N9 uplink tunnel information in the Nsmf_PDUSession_Create Response message (see steps in FIG. 5).
    In an alternative embodiment to what is illustrated in FIG. 5, only an "Indication to use UP Data Delivery" may be needed between H-SMF and V-SMF to decide to use UP for DoNAS data transfer, assuming the V-SMF does always support UP data transfer.
    In another alternative embodiment to what is illustrated in FIG. 5, the V-SMF instead indicates a VPLMN operator preference to use UP for DoNAS data transfer. Indication may then e.g. be named "Indication of preference for UP data transfer", assuming that CP data transfer over N16/N32 is default. The H-SMF indication is then a negotiation response.
8. The V-SMF sends a create SM context accept message (or a PDU Session Establishment Accept), e.g., providing indication that Data Over NAS-SM is enabled for this PDU session without including the N2 SM container.
    If V-SMF receives N9 tunnel info for user plane data delivery as the alternative described in step 7, the V-SMF also selects a V-UPF and allocate N9 downlink tunnel information through the N4 Session establishment procedure. The V-SMF provides the N9 downlink tunnel info to H-SMF/H-UPF through the PDU session modification procedure (see steps in FIG. 5). The H-SMF may depending on configuration received from UDM either request the H-UPF to configure a tunnel from the H-UPF to the NEF to provide NIDD API, or request the H-UPF to use tunneling over a N6 interface towards internet as specified in Technical Specification (TS) 23.501 V15.4.0 clause 5.6.10.3. FIG. 5 shows the use of NIDD API via NEF.
9. The AMF forwards the NAS message (e.g., including a PDU session ID and a PDU session establishment accept) to the UE.
    The UE can use NAS SM message to deliver UP data to V-SMF. The V-SMF send the NAS SM message/or Data to H-SMF through new defined Nsmf_PDUSession_DataTransfer service operation.

NOTE 1: The existing SMF service operation (Nsmf_PDUSession_Update) can alternatively be extended to deliver data.

NOTE 2: When the UE delivers data to AF/SCS/AS and using NEF as anchor (or vice versa), the following paths are used:

As in FIG. 4: UE↔V-SMF↔H-SMF↔NEF↔AF/SCS/AS

Thus, in some embodiments, in order to provide DoNAS delivery from the UE to the NEF:
    The V-SMF receives message from the UE comprising a data container comprising user data for the DoNAS data delivery between the NEF and the UE;
    The V-SMF sends a message (e.g., a PDU session update request message or a new message) to the H-SMF that comprises a data container comprising the user data;
    The H-SMF sends a message comprising a data container comprising the user data to the NEF.

In some embodiments, in order to provide DoNAS delivery from the NEF to the UE:
    The H-SMF receives a message (e.g., a PDU session update request message or a new message) from the NEF that comprises a data container comprising user data for the DoNAS data delivery between the NEF and the UE;
    The H-SMF sends a message (e.g., a PDU session update request message or a new message) to the V-SMF that comprises a data container comprising the user data;
    The V-SMF sends a message to the UE that comprises a data container comprising the user data.

Alternative 1: UE↔V-SMF↔V-UPF↔H-UPF↔H-SMF↔NEF↔AF/SCS/AS

Thus, in some embodiments, in order to provide DoNAS delivery from the UE to the NEF:
    The V-SMF receives message from the UE comprising a data container comprising user data for the DoNAS data delivery between the NEF and the UE;
    The V-SMF sends a message (e.g., a PDU session update request message or a new message) to the V-UPF that comprises a data container comprising the user data;
    The V-UPF sends a message to the H-UPF that comprises a data container that comprises the user data;
    The H-UPF sends a message to the H-SMF that comprises a data container comprising the user data;
    The H-SMF sends a message comprising a data container comprising the user data to the NEF.

In some embodiments, in order to provide DoNAS delivery from the NEF to the UE:
    The H-SMF receives a message (e.g., a PDU session update request message or a new message) from the NEF that comprises a data container comprising user data for the DoNAS data delivery between the NEF and the UE;
    The H-SMF sends a message to the H-UPF that comprises a data container comprising the user data;

The H-UPF sends a message to the V-UPF that comprises a data container comprising the user data;

The V-UPF sends a message (e.g., a PDU session update request message or a new message) to the V-SMF that comprises a data container comprising the user data;

The V-SMF sends a message to the UE that comprises a data container comprising the user data.

Alternative 2, as in FIG. 5: UE↔V-SMF↔V-UPF↔H-UPF↔NEF↔AF/SCS/AS

Thus, in some embodiments, in order to provide DoNAS delivery from the UE to the NEF:

The V-SMF receives message from the UE comprising a data container comprising user data for the DoNAS data delivery between the NEF and the UE;

The V-SMF sends a message (e.g., a PDU session update request message or a new message) to the V-UPF that comprises a data container comprising the user data;

The V-UPF sends a message to the H-UPF that comprises a data container that comprises the user data;

The H-UPF sends a message to the NEF that comprises a data container comprising the user data.

In some embodiments, in order to provide DoNAS delivery from the NEF to the UE:

The H-UPF receives a message from the NEF that comprises a data container comprising user data for the DoNAS data delivery between the NEF and the UE;

The H-UPF sends a message to the V-UPF that comprises a data container comprising the user data;

The V-UPF sends a message (e.g., a PDU session update request message or a new message) to the V-SMF that comprises a data container comprising the user data;

The V-SMF sends a message to the UE that comprises a data container comprising the user data.

Figure 6:
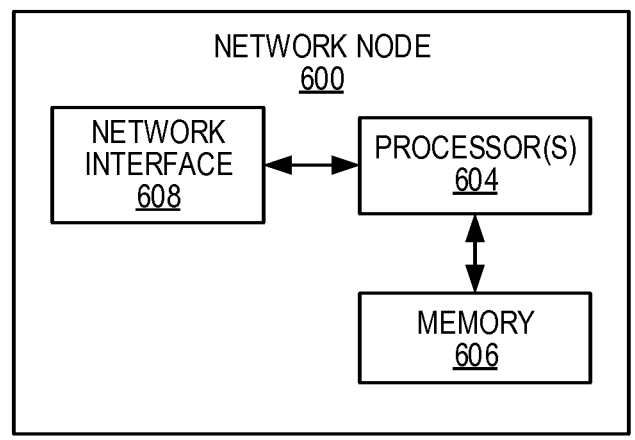
FIG. 6 is a schematic block diagram of a network node according to some embodiments of the present disclosure.

FIG. 6 is a schematic block diagram of a network node 600 according to some embodiments of the present disclosure. The network node 600 may be, for example, a core network node or a network node implementing a core network entity (e.g., a SMF, UPF, NEF, or the like). As illustrated, the network node 600 includes one or more processors 604 (e.g., Central Processing Units (CPUs), Application Specific Integrated Circuits (ASICs), Field Programmable Gate Arrays (FPGAs), and/or the like), memory 606, and a network interface 608. The one or more processors 604 are also referred to herein as processing circuitry. The one or more processors 604 operate to cause the network node 600 to provide one or more functions of a core network entity (e.g., an AMF, V-SMF, V-UPF, H-SMF, H-UPF, UDM, or NEF) as described herein. In some embodiments, the function(s) are implemented in software that is stored, e.g., in the memory 606 and executed by the one or more processors 604.

Figure 7:
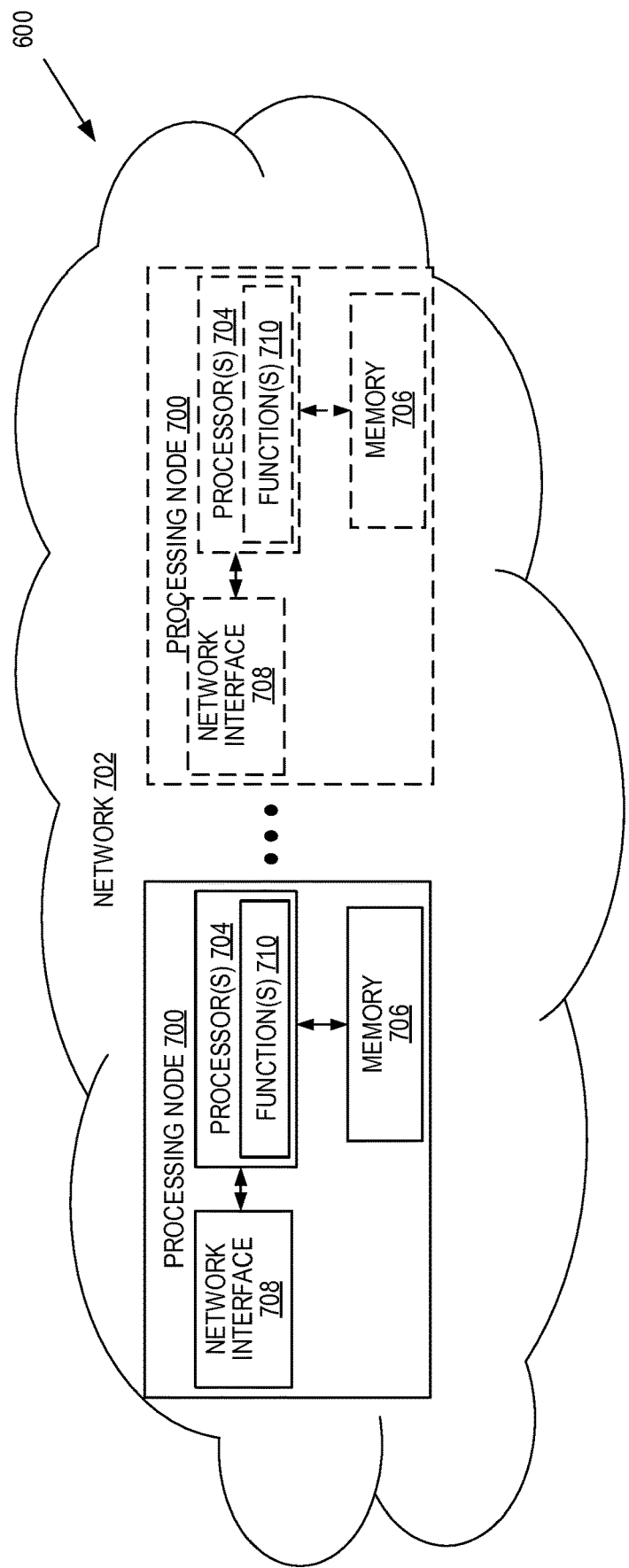
FIG. 7 is a schematic block diagram that illustrates a virtualized embodiment of the network node according to some embodiments of the present disclosure.

FIG. 7 is a schematic block diagram that illustrates a virtualized embodiment of the network node 600 according to some embodiments of the present disclosure. This discussion is equally applicable to other types of network nodes. Further, other types of network nodes may have similar virtualized architectures.

As used herein, a "virtualized" network node is an implementation of the network node 600 in which at least a portion of the functionality of the network node 600 is implemented as a virtual component(s) (e.g., via a virtual machine(s) executing on a physical processing node(s) in a network(s)). As illustrated, in this example, the network node 600 includes one or more processing nodes 700 coupled to or included as part of a network(s) 702. Each processing node 700 includes one or more processors 704 (e.g., CPUs, ASICs, FPGAs, and/or the like), memory 706, and a network interface 708.

In this example, functions 710 of the network node 600 described herein (e.g., the functions of a core network entity such as, e.g., an AMF, V-SMF, V-UPF, H-SMF, H-UPF, UDM, or NEF) are implemented at the one or more processing nodes 700 in any desired manner. In some particular embodiments, some or all of the functions 710 of the network node 600 described herein are implemented as virtual components executed by one or more virtual machines implemented in a virtual environment(s) hosted by the processing node(s) 700.

In some embodiments, a computer program including instructions which, when executed by at least one processor, causes the at least one processor to carry out the functionality of core network entity (e.g., an AMF, V-SMF, V-UPF, H-SMF, H-UPF, UDM, or NEF) as described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
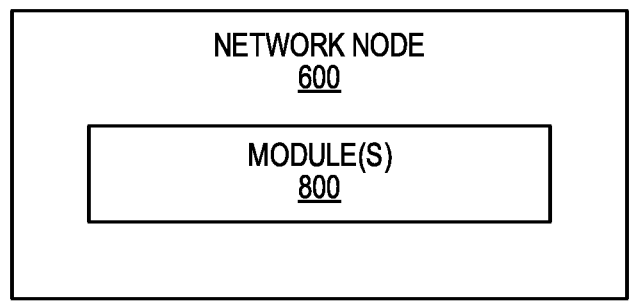
FIG. 8 is a schematic block diagram of the network node according to some other embodiments of the present disclosure.

FIG. 8 is a schematic block diagram of the network node 600 according to some other embodiments of the present disclosure. The network node 600 includes one or more modules 800, each of which is implemented in software. The module(s) 800 provide the functionality of the a core network entity (e.g., an AMF, V-SMF, V-UPF, H-SMF, H-UPF, UDM, or NEF) as described herein.

Figure 9:
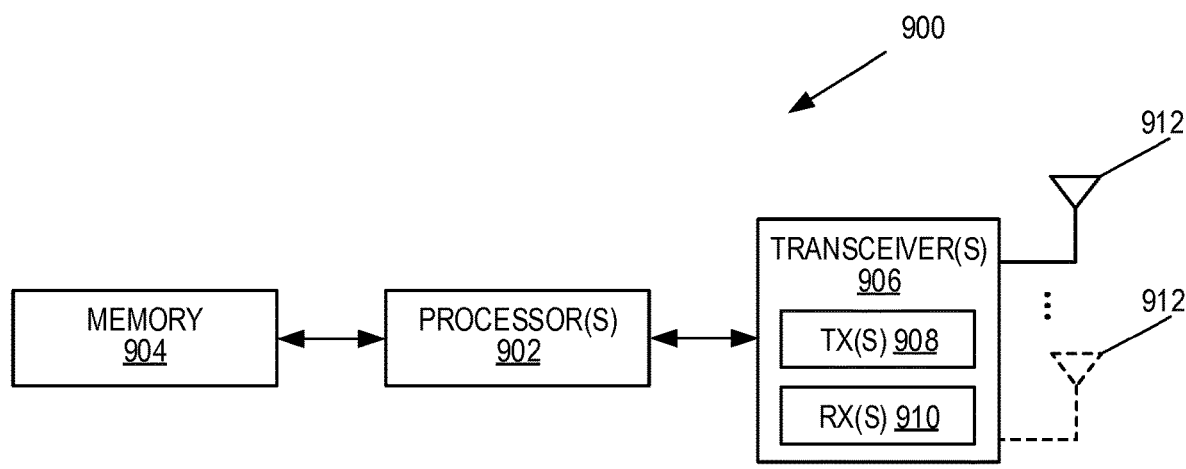
FIG. 9 is a schematic block diagram of a User Equipment device (UE) according to some embodiments of the present disclosure.

FIG. 9 is a schematic block diagram of a UE 900 according to some embodiments of the present disclosure. As illustrated, the UE 900 includes one or more processors 902 (e.g., CPUs, ASICs, FPGAs, and/or the like), memory 904, and one or more transceivers 906 each including one or more transmitters 908 and one or more receivers 910 coupled to one or more antennas 912. The transceiver(s) 906 includes radio-front end circuitry connected to the antenna(s) 912 that is configured to condition signals communicated between the antenna(s) 912 and the processor(s) 902, as will be appreciated by on of ordinary skill in the art. The processors 902 are also referred to herein as processing circuitry. The transceivers 906 are also referred to herein as radio circuitry. In some embodiments, the functionality of the UE 900 described above may be fully or partially implemented in software that is, e.g., stored in the memory 904 and executed by the processor(s) 902. Note that the UE 900 may include additional components not illustrated in FIG. 9 such as, e.g., one or more user interface components (e.g., an input/output interface including a display, buttons, a touch screen, a microphone, a speaker(s), and/or the like and/or any other components for allowing input of information into the UE 900 and/or allowing output of information from the UE 900), a power supply (e.g., a battery and associated power circuitry), etc.

In some embodiments, a computer program including instructions which, when executed by at least one processor, causes the at least one processor to carry out the functionality of the UE 900 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
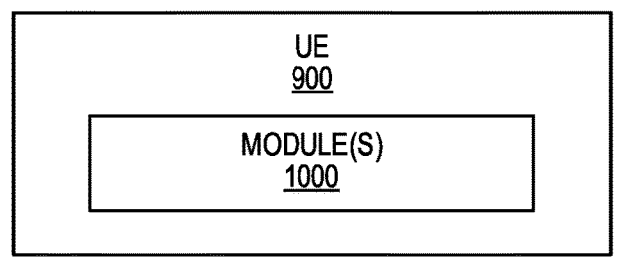
FIG. 10 is a schematic block diagram of the UE according to some other embodiments of the present disclosure.
Figure 11:
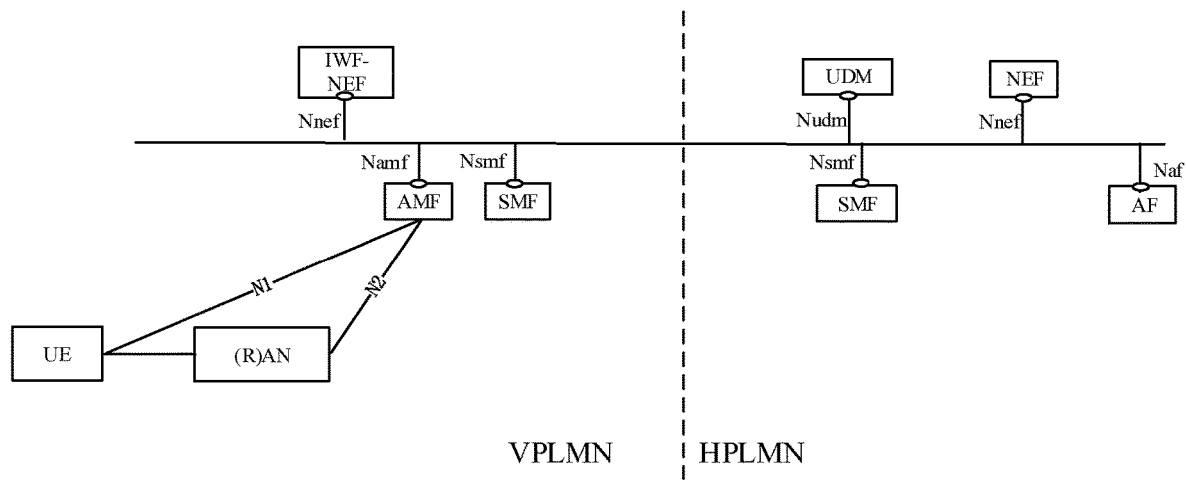
FIG. 11 is a reproduction of FIG. 6.30.1.2.2-1 from Third Generation Partnership Project (3GPP) Technical Report (TR) 23.724 V16.0.0.
Figure 12:
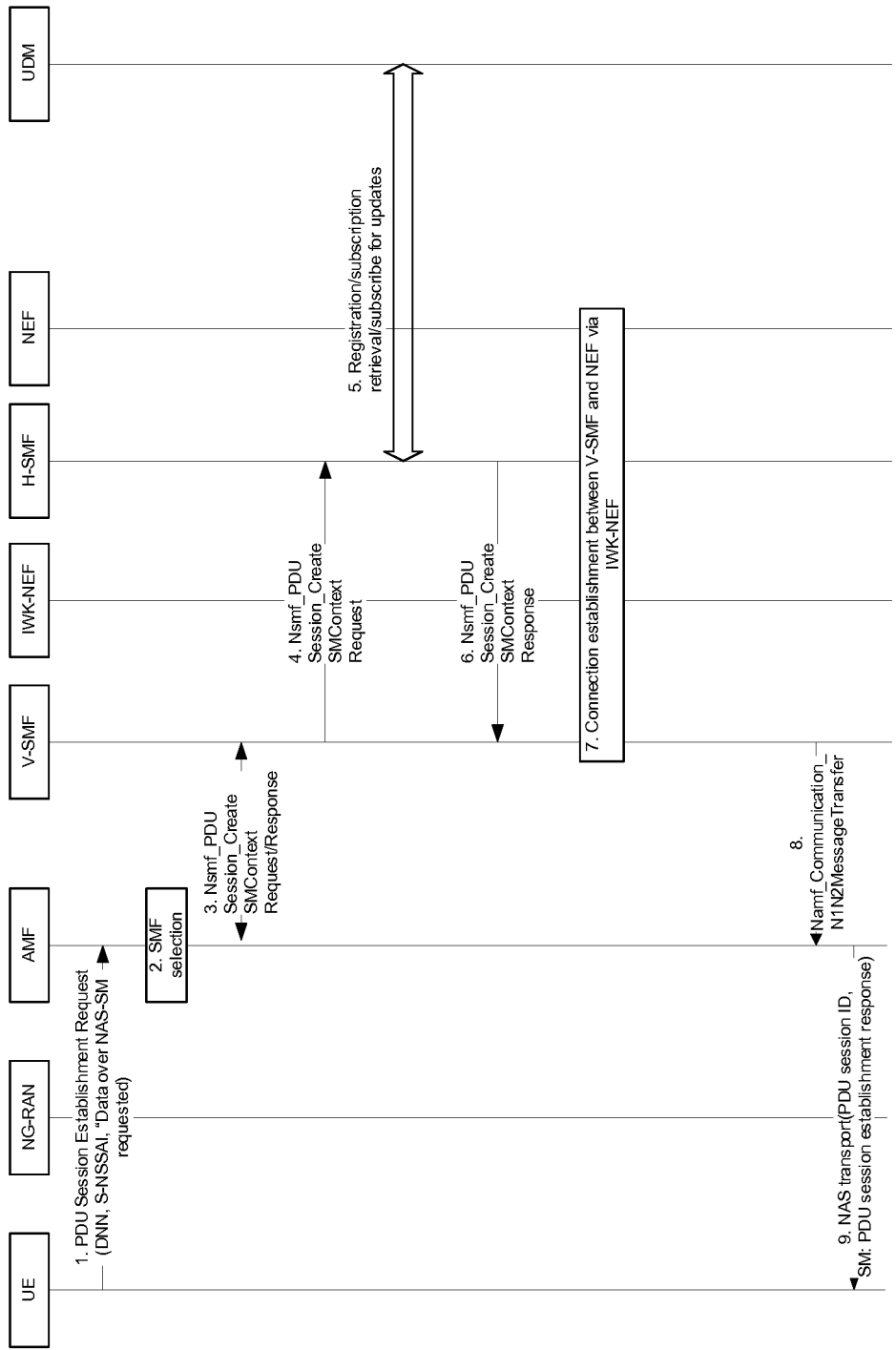
FIG. 12 is a reproduction of FIG. 6.30.4.2-1 from 3GPP Technical Specification (TS) 23.502 V15.4.1.

FIG. 10 is a schematic block diagram of the UE 900 according to some other embodiments of the present disclosure. The UE 900 includes one or more modules 1000, each of which is implemented in software. The module(s) 1000 provide the functionality of the UE 900 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some Embodiments

Some of the embodiments described above may be summarized in the following manner:

1. A method performed by a Visited Session Management Function, V-SMF, in a core network of a cellular communications system to enable Data over Non-Access Stratum, DoNAS, data delivery in a roaming scenario, the method comprising:
   sending (FIG. 4, step 4; FIG. 5, step 4), from the V-SMF to a Home Session Management Function, H-SMF, a Packet Data Unit, PDU, session create request during PDU session establishment for DoNAS data delivery for a User Equipment, UE, in a roaming scenario; and
   receiving (FIG. 4, step 7; FIG. 5, step 7) a response from the H-SMF.
2. The method of embodiment 1 wherein the PDU session create request comprises an indication that control plane can be used for data delivery.
3. The method of embodiment 1 or 2 wherein the response from the H-SMF provides an indication that a control plane interface between the V-SMF and the H-SMF is to be used for a data path for the DoNAS data delivery for the UE.
4. The method of embodiment 3 further comprising:
   prior to sending the PDU session create request to the H-SMF, receiving (FIG. 4, step 3; FIG. 5, step 3) a create SM context request from an Access and Mobility Management Function, AMF; and
   after receiving the response from the H-SMF, sending (FIG. 4, step 8; FIG. 5, step 8) a create SM context accept message to the AMF.
5. The method of embodiment 1 or 2 wherein the response from the H-SMF provides an indication that a user plane interface between a Visited User Plane Function, V-UPF, associated with the V-SMF and a Home User Plane Function, H-UPF, associated with the H-SMF is to be used for the data path for the DoNAS data delivery for the UE.
6. The method of embodiment 5 wherein the response from the H-SMF comprises tunnel information (e.g., N9 uplink tunnel information) for an uplink interface to the H-UPF.
7. The method of embodiment 6 further comprising, after receiving the response from the H-SMF:
   selecting the V-UPF;
   allocate tunnel information (e.g., N9 downlink tunnel information) for a downlink interface to the V-UPF; and
   providing, to the H-SMF and/or the H-UPF, the tunnel information for the downlink interface to the V-UPF.
8. The method of any one of embodiments 5 to 7 further comprising:
   prior to sending the PDU session create request to the H-SMF, receiving (FIG. 4, step 3; FIG. 5, step 3) a create SM context request from an Access and Mobility Management Function, AMF; and
   after receiving the response from the H-SMF, sending (FIG. 4, step 8; FIG. 5, step 8) a create SM context accept message to the AMF.
9. The method of any one of embodiments 1 to 8 further comprising:
   receiving a message from the UE comprising a data container comprising user data for the DoNAS data delivery between a Network Exposure Function, NEF, and the UE; and
   sending a message (e.g., a PDU session update request message or a new message) to the H-SMF that comprises a data container comprising the user data.
10. The method of any one of embodiments 1 to 8 further comprising:
    receiving a message (e.g., a PDU session update message or a new message) from the H-SMF comprising a data container comprising user data for the DoNAS data delivery; and
    sending a message from the V-SMF to the UE comprising a data container comprising the user data.
11. The method of any one of embodiments 1 to 8 further comprising:
    receiving a message from the UE comprising a data container comprising user data for the DoNAS data delivery between the NEF and the UE; and
    sending a message to the V-UPF that comprises a data container comprising the user data.
12. The method of any one of embodiments 1 to 8 further comprising:
    receiving a message from the V-UPF comprising a data container comprising user data for the DoNAS data delivery; and
    sending a message from the V-SMF to the UE comprising a data container comprising the user data.
13. A method performed by a Home Session Management Function, H-SMF, in a core network of a cellular communications system to enable Data over Non-Access Stratum, DoNAS, data delivery in a roaming scenario, the method comprising:

receiving (FIG. 4, step 4; FIG. 5, step 4), from a Visited Session Management Function, V-SMF, a Packet Data Unit, PDU, session create request during PDU session establishment for DoNAS data delivery for a User Equipment, UE, in a roaming scenario; and sending (FIG. 4, step 7; FIG. 5, step 7) a response to the V-SMF.

14. The method of embodiment 13 wherein the PDU session create request comprises an indication that control plane can be used for data delivery.

15. The method of embodiment 13 or 14 further comprising deciding whether to use a control plane interface between the V-SMF and the H-SMF for a data path for the DoNAS data delivery for the UE or a user plane interface between a Visited User Plane Function, V-UPF, and a Home User Plane Function, H-UPF, for the data path for the DoNAS delivery for the UE.

16. The method of any one of embodiments 13 to 15 wherein the response sent to the V-SMF provides an indication, to the V-SMF, as to whether to use a control plane interface between the V-SMF and the H-SMF for a data path for the DoNAS data delivery for the UE or a user plane interface between a Visited User Plane Function, V-UPF, and a Home User Plane Function, H-UPF, for the data path for the DoNAS delivery for the UE.

17. The method of any one of embodiments 13 to 16 wherein the response sent to the V-SMF provides an indication that a control plane interface between the V-SMF and the H-SMF is to be used for a data path for the DoNAS data delivery for the UE.

18. The method of any one of embodiments 13 to 16 wherein the response sent to the V-SMF provides an indication that a user plane interface between a V-UPF associated with the V-SMF and a Home User Plane Function, H-UPF, associated with the H-SMF is to be used for the data path for the DoNAS data delivery for the UE.

19. The method of embodiment 18 wherein the response sent to the S-SMF comprises tunnel information (e.g., N9 uplink tunnel information) for an uplink interface to the H-UPF.

20. The method of embodiment 19 further comprising, receiving, from the H-SMF, tunnel information for a downlink interface to the V-UPF and providing the tunnel information to the H-UPF.

21. The method of any one of embodiments 18 to 20 further comprising triggering selection of the H-UPF and allocation of the tunnel information for the uplink interface to the H-UPF.

22. The method of any one of embodiments 13 to 21 further comprising:
receiving a message from a NEF comprising a data container comprising user data for the DoNAS data delivery between the NEF and the UE; and
sending a message (e.g., a PDU session update request message or a new message) to the V-SMF that comprises a data container comprising the user data.

23. The method of any one of embodiments 13 to 21 further comprising:
receiving a message (e.g., a PDU session update message or a new message) from the V-SMF comprising a data container comprising user data for the DoNAS data delivery; and
sending a message from the H-SMF to a NEF comprising a data container comprising the user data.

24. The method of any one of embodiments 13 to 21 further comprising:
receiving a message from a NEF comprising a data container comprising user data for the DoNAS data delivery between the NEF and the UE; and
sending a message (e.g., a PDU session update request message or a new message) to the H-UPF that comprises a data container comprising the user data.

25. The method of any one of embodiments 13 to 21 further comprising:
receiving a message (e.g., a PDU session update message or a new message) from the H-UPF comprising a data container comprising user data for the DoNAS data delivery; and
sending a message from the H-SMF to a NEF comprising a data container comprising the user data.

26. The method of any one of embodiments 1 to 25 wherein the DoNAS data delivery is via an extension to an existing SMF service operation (e.g., Nsmf_P-DUSession_Update).

27. The method of any one of embodiments 1 to 25 wherein the DoNAS data delivery is via the following data path:
UE↔V-SMF↔H-SMF↔NEF↔AF/SCS/AS.

28. The method of any one of embodiments 1 to 25 wherein the DoNAS data delivery is via the following data path:
UE↔V-SMF↔V-UPF↔H-UPF↔H-SMF↔NEF↔AF/SCS/AS.

29. The method of any one of embodiments 1 to 25 wherein the DoNAS data delivery is via the following data path:
UE↔V-SMF↔V-UPF↔H-UPF↔NEF↔AF/SCS/AS.

30. A method performed by an Access and Mobility Management Function, AMF, in a core network of a cellular communications system to enable Data over Non-Access Stratum, DoNAS, data delivery in a roaming scenario, the method comprising:
during PDU session establishment for DoNAS data delivery for a User Equipment, UE, in a roaming scenario:
selecting (FIG. 4, step 2; FIG. 5, step 2), a Visited Session Management Function, V-SMF, that supports DoNAS data delivery and a Home Session Management Function, H-SMF; and
sending (FIG. 4, step 2; FIG. 5, step 2) a message to the V-SMF, the message comprising information that identifies the H-SMF.

31. The method of embodiment 30 wherein selecting (FIG. 4, step 2; FIG. 5, step 2), the V-SMF that supports DoNAS data delivery and the H-SMF comprises selecting the H-SMF such that the H-SMF is an H-SMF that supports SMF-NEF communication.

32. A core network entity adapted to perform the method of any one of embodiments 1 to 31.

33. A network node for implementing a core network entity, the network node comprising:
a network interface; and
processing circuitry associated with the network interface, the processing circuitry configured to cause the network node to implement the core network entity, wherein the core network entity is configured to perform the method of any one of embodiments 1 to 31.

Abbreviations

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Management Function
AN Access Network
API Application Program Interface
AS Access Stratum
ASIC Application Specific Integrated Circuit
AUSF Authentication Server Function
CP Control Plane
CPU Central Processing Unit
DN Data Network
DNN Data Network Name
DoNAS Data of Non-Access Stratum
DSP Digital Signal Processor
eNB Enhanced or Evolved Node B
EPC Evolved Packet Core
FPGA Field Programmable Gate Array
gNB New Radio Base Station
HPLMN Home Public Land Mobile Network
H-SMF Home Session Management Function
H-UPF Home User Plane Function
ID Identifier
IoT Internet of Things
IP Internet Protocol
IWF-NEF Interworking Network Exposure Function
LTE Long Term Evolution
MME Mobility Management Entity
MTC Machine Type Communication
NEF Network Exposure Function
NF Network Function
NIDD Non-Internet Protocol Data Delivery
NR New Radio
NRF Network Repository Function
NSSF Network Slice Selection Function
PCF Policy Control Function
PDU Packet Data Unit
P-GW Packet Data Network Gateway
PLMN Public Land Mobile Network
QoS Quality of Service
RAM Random Access Memory
RAN Radio Access Network
ROM Read Only Memory
RRH Remote Radio Head
RTT Round Trip Time
SCEF Service Capability Exposure Function
SCS Service Capability Server
SMF Session Management Function
S-NSSAI Single Network Slice Selection Assistance Information
SUPI Subscriber Permanent Identifier
TR Technical Report
TS Technical Specification
UDM Unified Data Management
UE User Equipment
UP User Plane
UPF User Plane Function
VPLMN Visited Public Land Mobile Network
V-SMF Visited Session Management Function

Appendix

3GPP TSG-SA WG2 Meeting #131  *S2-190xxxx*
Santa Cruz, Tenerife, Spain, 25 Feb - 1 Mar, 2019  *(Revision of S2-1901310)*

*CR-Form-v11.2*

CHANGE REQUEST

| 23.502 | CR | 0971 | rev | 4 | Current version: | 15.4.1 |

*For HELP on using this form: comprehensive instructions can be found at http://www.3gpp.org/Change-Requests.*

*Proposed change affects:*   UICC apps ☐   ME ☒   Radio Access Network ☐   Core Network ☒

| | |
|---|---|
| *Title:* | Introduction of small data transfer in Control Plane CIoT 5GS Optmisation |
| *Source to WG:* | Huawei, HiSilicon, Convida wireless, CATT, Samsung, China Mobile, NEC, Intel, Qualcomm, InterDigital, Ericsson |
| *Source to TSG:* | SA2 |
| *Work item code:* | 5G_CIoT    *Date:* 2019-2-13 |
| *Category:* | B    *Release:* Rel-16 |
| | *Use one of the following categories:*   *Use one of the following releases:* |
| | F *(correction)*   Rel-8 *(Release 8)* |
| | A *(mirror corresponding to a change in an earlier release)*   Rel-9 *(Release 9)* |
| | Rel-10 *(Release 10)* |
| | B *(addition of feature),*   Rel-11 *(Release 11)* |
| | C *(functional modification of feature)*   Rel-12 *(Release 12)* |
| | D *(editorial modification)*   Rel-13 *(Release 13)* |
| | Detailed explanations of the above categories can be found in 3GPP TR 21.900.   Rel-14 *(Release 14)* |
| | Rel-15 *(Release 15)* |
| | Rel-16 *(Release 16)* |
| *Reason for change:* | It has been concluded in TR 23.724 that infrequent small data transfer over NAS via N6 (see Solution #1) is to be introduced in the normative phase. |
| *Summary of change:* | This CR updates and introduces the following changes: |
| | - PDU Session Establishment procedure updated to establish a PDU Session using Control Plane CIoT 5GS optmisation to transfer data PDUs and PDU Session Anchor (NEF or UPF) Selection performed by the SMF. |
| | - Introduced the details of MO/MT Data Transport via Control Plane CIoT 5GS optmisation and N6 including: |

| | |
|---|---|
| | A): Define a new NAS message for the downlink/uplink NAS transport message.<br><br>B): Early Data Transmission by the UE for MO small data over NAS is introduced.<br><br>C): Integrity protection, ciphering and header compression.<br><br>D): Define two types Release Assistance Indication (NAS Release Assistance Indication and AS Release Assistance Indication).<br><br>E): Define new message Nsmf_PDUSession_DataTransfer for small data transfer between SMFs over N16 in the roaming case.<br><br>- Updated the UE Subscription data types to include "Invoke NEF Selection indication" and "NIDD information" which are used for PDU Session Establishment using NAS to transfer PDUs terminated at NEF.<br><br>- A new SMF Service Operation to support data transfer is pending CT4 discussion. |
| Consequences if not approved: | Feature not supported. |

| Clauses affected: | 4.3.2.2.1, 4.3.2.2, 4.x (new), 4.x.1 (new), 4.x.2 (new), 5.2.3.3.1 |
|---|---|
| Other specs affected: (show related CRs) | Y \| N \|<br>  \| X \| Other core specifications    TS/TR ... CR ...<br>  \| X \| Test specifications          TS/TR ... CR ...<br>  \| X \| O&M Specifications           TS/TR ... CR ... |
| Other comments: | |

** BEGINNING OF CHANGES **

4.3.2.2.1     Non-roaming and Roaming with Local Breakout

Clause 4.3.2.2.1 specifies PDU Session establishment in the non-roaming and roaming with local breakout cases. The procedure is used to:

- Establish a new PDU Session;

- Handover a PDN Connection in EPS to PDU Session in 5GS without N26 interface;

- Switching an existing PDU Session between non-3GPP access and 3GPP access. The specific system behaviour in this case is further defined in clause 4.9.2; or

- Request a PDU Session for Emergency services.

In case of roaming, the AMF determines if a PDU Session is to be established in LBO or Home Routing. In the case of LBO, the procedure is as in the case of non-roaming with the difference that the AMF, the SMF, the UPF and the PCF are located in the visited network. PDU Sessions for Emergency services are never established in Home Routed mode. In case of LBO, the NEF is not used.

NOTE 1: UE provides both the home and visited PLMN S-NSSAIs to the network as described in clause 5.15.5.3 of TS 23.501 [2].

Figure 13:
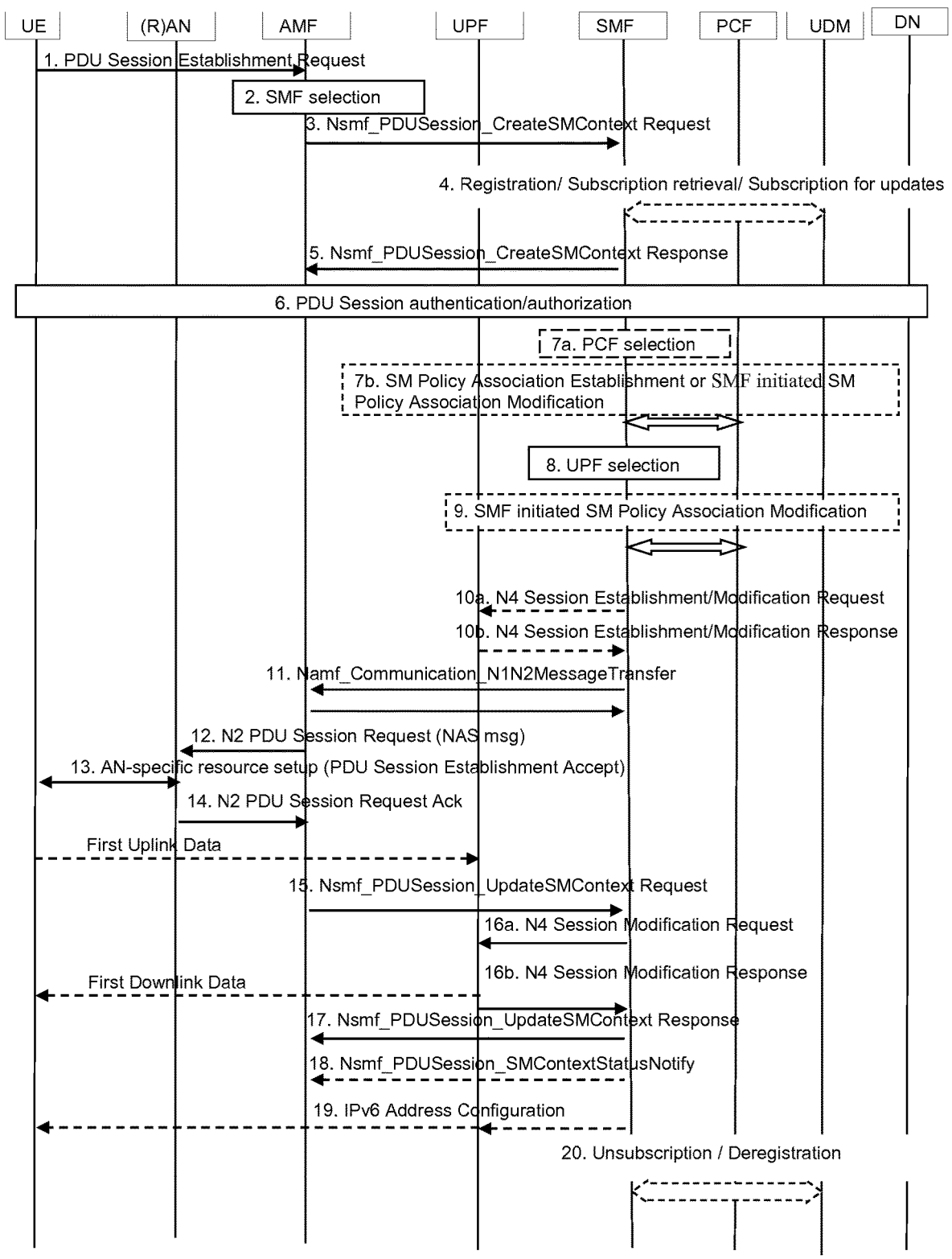
FIG. 13 is a reproduction of FIG. 4.3.2.2.1-1 from 3GPP TS 23.502 V15.4.1.

See Figure 13.

Figure 4.3.2.2.1-1: UE-requested PDU Session Establishment for non-roaming and roaming with local breakout

The procedure assumes that the UE has already registered on the AMF thus unless the UE is Emergency Registered the AMF has already retrieved the user subscription data from the UDM.

1. From UE to AMF: NAS Message (S-NSSAI(s), DNN, PDU Session ID, Request type, Old PDU Session ID, N1 SM container (PDU Session Establishment Request)).

In order to establish a new PDU Session, the UE generates a new PDU Session ID.

The UE initiates the UE Requested PDU Session Establishment procedure by the transmission of a NAS message containing a PDU Session Establishment Request within the N1 SM container. The PDU Session Establishment Request includes a PDU session ID, Requested PDU Session Type, a Requested SSC mode, 5GSM Capability PCO, SM PDU DN Request Container, Number Of Packet Filters.

The Request Type indicates "Initial request" if the PDU Session Establishment is a request to establish a new PDU Session and indicates "Existing PDU Session" if the request refers to an existing PDU Session switching between 3GPP access and non-3GPP access or to a PDU Session handover from an existing PDN connection in EPC. If the request refers to an existing PDN connection in EPC, the S-NSSAI is set as described in TS 23.501 [2] clause 5.15.7.2

When Emergency service is required and an Emergency PDU Session is not already established, a UE shall initiate the UE Requested PDU Session Establishment procedure with a Request Type indicating "Emergency Request".

The Request Type indicates "Emergency Request" if the PDU Session Establishment is a request to establish a PDU Session for Emergency services. The Request Type indicates "Existing Emergency PDU Session" if the request refers to an existing PDU Session for Emergency services switching between 3GPP access and non-3GPP access or to a PDU Session handover from an existing PDN connection for Emergency services in EPC.

The 5GSM Core Network Capability is provided by the UE and handled by SMF as defined in TS 23.501 [2] clause 5.4.4b. The 5GSM Capability also includes the UE Integrity Protection Maximum Data Rate.

The Number Of Packet Filters indicates the number of supported packet filters for signalled QoS rules for the PDU Session that is being established. The number of packet filters indicated by the UE is valid for the lifetime of the PDU Session.

The NAS message sent by the UE is encapsulated by the AN in a N2 message towards the AMF that should include User location information and Access Type Information.

The PDU Session Establishment Request message may contain SM PDU DN Request Container containing information for the PDU Session authorization by the external DN.

The UE includes the S-NSSAI from the Allowed NSSAI of the current access type. If the Mapping of Allowed NSSAI was provided to the UE, the UE shall provide both the S-NSSAI from the Allowed NSSAI and the corresponding S-NSSAI from the Mapping Of Allowed NSSAI.

If the procedure is triggered for SSC mode 3 operation, the UE shall also include the Old PDU Session ID which indicates the PDU Session ID of the on-going PDU Session to be released, in NAS message. The Old PDU Session ID is an optional parameter which is included only in this case.

The AMF receives from the AN the NAS SM message (built in step 1) together with User Location Information (e.g. Cell Id in case of the NG-RAN).

The UE shall not trigger a PDU Session establishment for a PDU Session corresponding to a LADN when the UE is outside the area of availability of the LADN.

If the UE is establishing a PDU session for IMS, and the UE is configured to discover the P-CSCF address during connectivity establishment, the UE shall include an indicator that it requests a P-CSCF IP address(es) within the SM container.

The PS Data Off status is included in the PCO in the PDU Session Establishment Request message.2. The AMF determines that the message corresponds to a request for a new PDU Session based on that Request Type indicates "initial request" and that the PDU Session ID is not used for any existing PDU Session(s) of the UE. If the NAS message does not contain an S-NSSAI, the AMF determines a default S-NSSAI for the requested PDU Session either according to the UE subscription, if it contains only one default S-NSSAI, or based on operator policy. When the NAS Message contains an S-NSSAI but it does not contain a DNN, the AMF determines the DNN for the requested PDU Session by selecting the default DNN for this S-NSSAI if the default DNN is present in the UE's Subscription Information; otherwise the serving AMF selects a locally configured DNN for this S-NSSAI. If the DNN provided by the UE is not supported by the network and AMF can not select an SMF by querying NRF, the AMF shall reject the NAS Message containing PDU Session Establishment Request from the UE with a cause indicating that the DNN is not supported.

The AMF selects an SMF as described in clause 6.3.2 of TS 23.501 [2] and clause 4.3.2.2.3. If the Request Type indicates "Initial request" or the request is due to handover from EPS or from non-3GPP access serving by a different AMF, the AMF stores an association of the S-NSSAI(s), the DNN, the PDU Session ID, the SMF ID as well as the Access Type of the PDU Session.

If the Request Type is "initial request" and if the Old PDU Session ID indicating the existing PDU Session is also contained in the message, the AMF selects an SMF as described in clause 4.3.5.2 and stores an association of the new PDU Session ID, the S-NSSAI, the selected SMF ID as well as Access Type of the PDU Session.

If the Request Type indicates "Existing PDU Session", the AMF selects the SMF based on SMF-ID received from UDM. The case where the Request Type indicates "Existing PDU Session", and either the AMF does not recognize the PDU Session ID or the subscription context that the AMF received from UDM during the Registration or Subscription Profile Update Notification procedure does not contain an SMF ID corresponding to the PDU Session ID constitutes an error case. The AMF updates the Access Type stored for the PDU Session.

If the Request Type indicates "Existing PDU Session" referring to an existing PDU Session moved between 3GPP access and non-3GPP access, then if the S-NSSAI of the PDU Session is present in the Allowed NSSAI of the target access type, the PDU Session Establishment procedure can be performed in the following cases:

- the SMF ID corresponding to the PDU Session ID and the AMF belong to the same PLMN;

- the SMF ID corresponding to the PDU Session ID belongs to the HPLMN;

Otherwise the AMF shall reject the PDU Session Establishment Request with an appropriate reject cause.

NOTE 2: The SMF ID includes the PLMN ID that the SMF belongs to.

The AMF shall reject a request coming from an Emergency Registered UE and the Request Type indicates neither "Emergency Request" nor "Existing Emergency PDU Session". When the Request Type indicates "Emergency Request", the AMF is not expecting any S-NSSAI and DNN value provided by the UE and uses locally configured values instead. The AMF stores the Access Type of the PDU Session.

If the Request Type indicates "Emergency Request" or "Existing Emergency PDU Session", the AMF selects the SMF as described in TS 23.501 [2], clause 5.16.4.

2. If the PDU Session is enabled for Control Plane CIoT 5GS Optimisation, the AMF selects home SMF (and visited SMF in the roaming case) which supports the Control Plane CIoT 5GS Optimisation.

3. From AMF to SMF: Either Nsmf_PDUSession_CreateSMContext Request (SUPI, DNN, S-NSSAI(s), PDU Session ID, AMF ID, Request Type, PCF ID, Priority Access, N1 SM container (PDU Session Establishment Request), User location information, Access Type, PEI, GPSI, UE presence in LADN service area, Subscription For PDU Session Status Notification, DNN Selection Mode, Trace Requirements, Control Plane CIoT 5GS Optimisation indication) or Nsmf_PDUSession_UpdateSMContext Request (SUPI, DNN, S-NSSAI(s), PDU Session ID, AMF ID, Request Type, N1 SM container (PDU Session Establishment Request), User location information, Access Type, RAT type, PEI).

If the AMF does not have an association with an SMF for the PDU Session ID provided by the UE (e.g. when Request Type indicates "initial request"), the AMF invokes the Nsmf_PDUSession_CreateSMContext Request, but if the AMF already has an association with an SMF for the PDU Session ID provided by the UE (e.g. when Request Type indicates "existing PDU Session"), the AMF invokes the Nsmf_PDUSession_UpdateSMContext Request.

The AMF sends the S-NSSAI from the Allowed NSSAI to the SMF. For roaming scenario, the AMF also sends the corresponding S-NSSAI from the Mapping Of Allowed NSSAI to the SMF.

The AMF ID is the UE's GUAMI which uniquely identifies the AMF serving the UE. The AMF forwards the PDU Session ID together with the N1 SM container containing the PDU Session Establishment Request received from the UE. The GPSI shall be included if available at AMF.

The AMF determines Access Type and RAT Type based on the Global RAN Node ID associated with the N2 interface.

The AMF provides the PEI instead of the SUPI when the UE in limited service state has registered for Emergency services (i.e. Emergency Registered) without providing a SUPI. The PEI is defined in TS 23.501 [2] clause 5.9.3. In case the UE in limited service state has registered for Emergency services (i.e. Emergency Registered) with a SUPI but has not been authenticated the AMF indicates that the SUPI has not been authenticated. The SMF determines that the UE has not been authenticated when it does not receive a SUPI for the UE or when the AMF indicates that the SUPI has not been authenticated.

If the AMF determines that the DNN corresponds to an LADN then the AMF provides the "UE presence in LADN service area" that indicates if the UE is IN or OUT of the LADN service area.

If the Old PDU Session ID is included in step 1, and if the SMF is not to be reallocated, the AMF also includes Old PDU Session ID in the Nsmf_PDUSession_CreateSMContext Request.

DNN Selection Mode is determined by the AMF. It indicates whether an explicitly subscribed DNN has been provided by the UE in its PDU Session Establishment Request.

The SMF may use DNN Selection Mode when deciding whether to accept or reject the UE request.

The AMF includes Priority Access indication if it received an Establishment Cause as part of AN parameters during the Registration procedure or Service Request procedure where the Establishment Cause indicates high priority access. The SMF uses Priority Access indication to determine if the UE request is subject to exemption from NAS level congestion control.

In the local breakout case, if the SMF (in the VPLMN) is not able to process some part of the N1 SM information that Home Routed Roaming is required, and the SMF responds to the AMF that it is not the right SMF to handle the N1 SM message by invoking Nsmf_PDUSession_CreateSMContext Response service operation. The SMF includes a proper N11 cause code triggering the AMF to proceed with home routed case. The procedure starts again at step 2 of clause 4.3.2.2.2.

The AMF may include a PCF ID in the Nsmf_PDUSession_CreateSMContext Request. This PCF ID identifies the H-PCF in the non-roaming case and the V-PCF in the local breakout roaming case.

The AMF includes Trace Requirements if Trace Requirements have been received in subscription data.

The AMF decides to use the Control Plane CIoT 5GS Optimisation and sends the Control Plane CIoT 5GS Optimisation indication to the SMF.

4. If Request Type in step 3 indicates neither "Emergency Request" nor "Existing Emergency PDU Session" and, if the SMF has not yet registered for this PDU Session ID, then the SMF registers with the UDM using Nudm_UECM_Registration (SUPI, DNN, S-NSSAI, PDU Session ID) for a given PDU Session. As a result, the UDM stores following information: SUPI, SMF identity and the associated DNN and PDU Session ID. The UDM may further store this information in UDR by Nudr_DM_Update (SUPI, Subscription Data, UE context in SMF data). If Session Management Subscription data for corresponding SUPI, DNN and S-NSSAI is not available, then SMF retrieves the Session Management Subscription data using Nudm_SDM_Get (SUPI, Session Management Subscription data, DNN, S-NSSAI) and subscribes to be notified when this subscription data is modified using Nudm_SDM_Subscribe (SUPI, Session Management Subscription data, DNN, S-NSSAI). UDM may get this information from UDR by Nudr_DM_Query (SUPI, Subscription Data, Session Management Subscription data, DNN, S-NSSAI) and may subscribe to notifications from UDR for the same data by Nudr_DM_subscribe. The S-NSSAI used with the UDM is the S-NSSAI with value for the HPLMN.

The SMF may use DNN Selection Mode when deciding whether to retrieve the Session Management Subscription data e.g. in case the (DNN, S-NSSAI) is not explicitly subscribed, the SMF may use local configuration instead of Session Management Subscription data.

If the Request Type received in step 3 indicates "Emergency Request"

- For an authenticated non-roaming UE, based on operator configuration (e.g. related with whether the operator uses a fixed SMF for Emergency calls, etc.), the SMF may register in the UDM using Nudm_UECM_Registration (SUPI, PDU Session ID, Indication of Emergency Services) for a given PDU Session that is applicable for emergency services. As a result, the UDM shall store the applicable PDU Session for Emergency services.

- For an unauthenticated UE or a roaming UE, the SMF shall not register in the UDM for a given PDU Session.

If the Request Type in step 3 indicates "Existing PDU Session" or "Existing Emergency PDU Session" the SMF determines that the request is due to switching between 3GPP access and non-3GPP access or due to handover from EPS. The SMF identifies the existing PDU Session based on the PDU Session ID. In such a case, the SMF does not create a new SM context but instead updates the existing SM context and provides the representation of the updated SM context to the AMF in the response.

If the Request Type is "Initial request" and if the Old PDU Session ID is included in Nsmf_PDUSession_CreateSMContext Request, the SMF identifies the existing PDU Session to be released based on the Old PDU Session ID.

Subscription data includes the Allowed PDU Session Type(s), Allowed SSC mode(s), default 5QI and ARP, subscribed Session-AMBR.

Static IP address/prefix may be included in the subscription data if the UE has subscribed to it.

The SMF checks the validity of the UE request: it checks

- Whether the UE request is compliant with the user subscription and with local policies;

- (If the DNN corresponds to an LADN), whether the UE is located within the LADN service area based on the "UE presence in LADN service area" indication from the AMF. If the AMF does not provide the "UE presence in LADN service area" indication and the SMF determines that the DNN corresponds to a LADN, then the SMF considers that the UE is OUT of the LADN service area;

If the UE request is considered as not valid, the SMF decides to not accept to establish the PDU Session.

5. From SMF to AMF: Either Nsmf_PDUSession_CreateSMContext Response (Cause, SM Context ID or N1 SM container (PDU Session Reject (Cause))) or an Nsmf_PDUSession_UpdateSMContext Response depending on the request received in step 3.

If the SMF received Nsmf_PDUSession_CreateSMContext Request in step 3 and the SMF is able to process the PDU Session establishment request, the SMF creates an SM context and responds to the AMF by providing an SM Context Identifier.

In case the UP Security Policy for the PDU Session is determined to have Integrity Protection set to "Required", the SMF may, based on local configuration, decide whether to accept or reject the PDU Session request based on the UE Integrity Protection Maximum Data Rate.

NOTE 3: The SMF can e.g. be configured to reject a PDU Session if the UE Integrity Protection Maximum Data Rate has a very low value, in case the services provided by the DN would require higher bitrates.

When the SMF decides to not accept to establish a PDU Session, the SMF rejects the UE request via NAS SM signalling including a relevant SM rejection cause by responding to the AMF with Nsmf_PDUSession_CreateSMContext Response. The SMF also indicates to the AMF that the PDU Session ID is to be considered as released, the SMF proceeds to step 20 and the PDU Session Establishment procedure is stopped.

6. Optional Secondary authorization/authentication.

If the Request Type in step 3 indicates "Existing PDU Session", the SMF does not perform secondary authorization/authentication.

If the Request Type received in step 3 indicates "Emergency Request" or "Existing Emergency PDU Session", the SMF shall not perform secondary authorization/authentication.

If the SMF needs to perform secondary authorization/authentication during the establishment of the PDU Session by a DN-AAA server as described in TS 23.501 [2] clause 5.6.6, the SMF triggers the PDU Session establishment authentication/authorization as described in clause 4.3.2.3.

7a. If dynamic PCC is to be used for the PDU Session, the SMF performs PCF selection as described in TS 23.501 [2], clause 6.3.7.1. If the Request Type indicates "Existing PDU Session" or "Existing Emergency PDU Session", the SMF shall use the PCF already selected for the PDU Session.

Otherwise, the SMF may apply local policy.

7b. The SMF may perform an SM Policy Association Establishment procedure as defined in clause 4.16.4 to establish an SM Policy Association with the PCF and get the default PCC Rules for the PDU Session. The GPSI shall be included if available at SMF. If the Request Type in step 3 indicates "Existing PDU Session", the SMF may provide information on the Policy Control Request Trigger condition(s) that have been met by an SMF initiated SM Policy Association Modification procedure as defined in clause 4.16.5.1. The PCF may provide policy information defined in clause 5.2.5.4 (and in TS 23.503 [20]) to SMF.

The PCF, based on the Emergency DNN, sets the ARP of the PCC rules to a value that is reserved for Emergency services as described in TS 23.503 [20].

NOTE 4: The purpose of step 7 is to receive PCC rules before selecting UPF. If PCC rules are not needed as input for UPF selection, step 7 can be performed after step 8.

8. If the Request Type in step 3 indicates "Initial request", the SMF selects an SSC mode for the PDU Session as described in TS 23.501 [2] clause 5.6.9.3. The SMF also selects one or more UPFs as needed as described in TS 23.501 [2] clause 6.3.3. In case of PDU Session Type IPv4 or IPv6 or IPv4v6, the SMF allocates an IP address/prefix for the PDU Session as described in TS 23.501 [2] clause 5.8.1. In case of PDU Session Type IPv6 or IPv4v6, the SMF also allocates an interface identifier to the UE for the UE to build its link-local address. For Unstructured PDU Session Type the SMF may allocate an IPv6 prefix for the PDU Session and N6 point-to-point tunnelling (based on UDP/IPv6) as described in TS 23.501 [2] clause 5.6.10.3. For Ethernet PDU Session Type, neither a MAC nor an IP address is allocated by the SMF to the UE for this PDU Session.

In case Control Plane CIoT 5GS Optimisation is enabled for this PDU session, then, 1) For Unstructured PDU Session Type, the SMF checks whether UE's subscription include an "Invoke NEF Selection" flag for the DNN/S-NSSAI combination. When the "Invoke NEF Selection" flag is present in the UE's subscription data, the SMF will select the NEF included in the subscription information as the anchor of this PDU Session. Otherwise, the SMF will select a UPF as the anchor of this PDU Session.    2) For other PDU Session Types, the SMF will perform UPF selection to select a UPF as the anchor of this PDU Session.

If the Request Type in Step 3 is "Existing PDU Session", the SMF maintains the same IP address/prefix that has already been allocated to the UE in the source network.

If the Request Type in step 3 indicates "Existing PDU Session" referring to an existing PDU Session moved between 3GPP access and non-3GPP access the SMF maintains the SSC mode of the PDU Session, the current PDU Session Anchor and IP address.

NOTE 5: The SMF may decide to trigger e.g. new intermediate UPF insertion or allocation of a new UPF as described in step 5 in clause 4.2.3.2.

If the Request Type indicates "Emergency Request", the SMF selects the UPF as described in TS 23.501 [2] clause 5.16.4 and selects SSC mode 1.

9. SMF may perform an SMF initiated SM Policy Association Modification procedure as defined in clause 4.16.5.1 to provide information on the Policy Control Request Trigger condition(s) that have been met. If Request Type is "initial request" and dynamic PCC is deployed and PDU Session Type is IPv4 or IPv6 or IPv4v6, SMF notifies the PCF (if the Policy Control Request Trigger condition is met) with the allocated UE IP address/prefix(es).

When PCF is deployed, the SMF shall further report the PS Data Off status to PCF if the PS Data Off Policy Control Request Trigger is provisioned, the additional behaviour of SMF and PCF for 3GPP PS Data Off is defined in TS 23.503 [20].

NOTE 6: If an IP address/prefix has been allocated before step 7 (e.g. subscribed static IP address/prefix in UDM/UDR) or the step 7 is perform after step 8, the IP address/prefix can be provided to PCF in step 7, and the IP address/prefix notification in this step can be skipped.

PCF may provide updated policies to the SMF. The PCF may provide policy information defined in clause 5.2.5.4 (and in TS 23.503 [20]) to SMF.

10. If Request Type indicates "initial request", the SMF initiates an N4 Session Establishment procedure with the selected UPF, otherwise it initiates an N4 Session Modification procedure with the selected UPF:

10a. The SMF sends an N4 Session Establishment/Modification Request to the UPF and provides Packet detection, enforcement and reporting rules to be installed on the UPF for this PDU Session. If CN Tunnel Info is allocated by the SMF, the CN Tunnel Info is provided to UPF in this step. If the selective User Plane deactivation is required for this PDU Session, the SMF determines the Inactivity Timer and provides it to the UPF. The SMF provides Trace Requirements to the UPF if it has received Trace Requirements.

In case the Control Plane CIoT 5GS Optimiation is enabled for this PDU session and the SMF selects the NEF as the anchor of this PDU Session in Step 8, the SMF performs SMF-NEF Connection Establishment Procedure as described in subclause 4.X.1.

10b. The UPF acknowledges by sending an N4 Session Establishment/Modification Response. If CN Tunnel Info is allocated by the UPF, the CN Tunnel Info is provided to SMF in this step.

If multiple UPFs are selected for the PDU Session, the SMF initiate N4 Session Establishment/Modification procedure with each UPF of the PDU Session in this step.

If the Request Type indicates "Existing PDU Session", and the SMF creates CN Tunnel Info, then this step is skipped. Otherwise, this step is performed to obtain the CN Tunnel Info from the UPF using the N4 Session Modification Procedure.

11. SMF to AMF: Namf_Communication_N1N2MessageTransfer (PDU Session ID, N2 SM information (PDU Session ID, QFI(s), QoS Profile(s), CN Tunnel Info, S-NSSAI from the Allowed NSSAI, Session-AMBR, PDU Session Type, User Plane Security Enforcement information, UE Integrity Protection Maximum Data Rate), N1 SM container (PDU Session Establishment Accept (QoS Rule(s) and QoS Flow level QoS parameters if needed for the QoS Flow(s) associated with the QoS rule(s), selected SSC mode, S-NSSAI(s), DNN, allocated IPv4 address, interface identifier, Session-AMBR, selected PDU Session Type, Reflective QoS Timer (if available), P-CSCF address(es)))). If multiple UPFs are used for the PDU Session, the CN Tunnel Info contain tunnel information related with the UPF that terminates N3.

The N2 SM information carries information that the AMF shall forward to the (R)AN which includes:

- The CN Tunnel Info corresponds to the Core Network address of the N3 tunnel corresponding to the PDU Session.

- One or multiple QoS profiles and the corresponding QFIs can be provided to the (R)AN. This is further described in TS 23.501 [2] clause 5.7.

- The PDU Session ID may be used by AN signalling with the UE to indicate to the UE the association between (R)AN resources and a PDU Session for the UE.

- A PDU Session is associated to an S-NSSAI and a DNN. The S-NSSAI provided to the (R)AN, is the S-NSSAI with the value for the serving PLMN.

- User Plane Security Enforcement information is determined by the SMF as described in clause 5.10.3 of TS 23.501 [2],

- If the User Plane Security Enforcement information indicates that Integrity Protection is "Preferred" or "Required", the SMF also includes the UE Integrity Protection Maximum Data Rate as received in the 5GSM Capability.

The N1 SM container contains the PDU Session Establishment Accept that the AMF shall provide to the UE. If the UE requested P-CSCF discovery then the message shall also include the P-CSCF IP address(es) as determined by the SMF. The PDU Session Establishment Accept includes S-NSSAI from the Allowed NSSAI. For roaming scenario, the PDU Session Establishment Accept also includes corresponding S-NSSAI from the Mapping Of Allowed NSSAI that SMF received in step 3.

If the Control Plane CIoT 5GS Optimisation is enabled for this PDU session, the N2 SM information is not included in this step.

Multiple QoS Rules, QoS Flow level QoS parameters if needed for the QoS Flow(s) associated with those QoS rule(s) and QoS Profiles may be included in the PDU Session Establishment Accept within the N1 SM and in the N2 SM information.

The Namf_Communication_N1N2MessageTransfer contains the PDU Session ID allowing the AMF to know which access towards the UE to use.12. AMF to (R)AN: N2 PDU Session Request (N2 SM information, NAS message (PDU Session ID, N1 SM container (PDU Session Establishment Accept))).

The AMF sends the NAS message containing PDU Session ID and PDU Session Establishment Accept targeted to the UE and the N2 SM information received from the SMF within the N2 PDU Session Request to the (R)AN.

13. (R)AN to UE: The (R)AN may issue AN specific signalling exchange with the UE that is related with the information received from SMF. For example, in case of a NG-RAN, an RRC Connection Reconfiguration may take place with the UE establishing the necessary NG-RAN resources related to the QoS Rules for the PDU Session request received in step 12.

(R)AN also allocates (R)AN N3 tTunnel Info for the PDU Session. In case of Dual Connectivity, the Master RAN node may assign some (zero or more) QFIs to be setup to a Master RAN node and others to the Secondary RAN node. The AN Tunnel Info includes a tunnel endpoint for each involved (R)AN node, and the QFIs assigned to each tunnel endpoint. A QFI can be assigned to either the Master RAN node or the Secondary RAN node and not to both.

(R)AN forwards the NAS message (PDU Session ID, N1 SM container (PDU Session Establishment Accept)) provided in step 12 to the UE. (R)AN shall only provide the NAS message to the UE if the necessary (R)AN resources are established and the allocation of (R)AN Tunnel Info are successful.

If MICO mode is active and the NAS message Request Type in step 1 indicated "Emergency Request", then the UE and the AMF shall locally deactivate MICO mode.

If the N2 SM information is not included in the Step 11, the following Step 14 to Step 20 are omitted 14. (R)AN to AMF: N2 PDU Session Response (PDU Session ID, Cause, N2 SM information (PDU Session ID, AN Tunnel Info, List of accepted/rejected QFI(s), User Plane Enforcement Policy Notification)).

The AN Tunnel Info corresponds to the Access Network address of the N3 tunnel corresponding to the PDU Session.

If the (R)AN rejects QFI(s) the SMF is responsible of updating the QoS rules and QoS Flow level QoS parameters if needed for the QoS Flow associated with the QoS rule(s) in the UE accordingly.

The NG-RAN rejects the establishment of UP resources for the PDU Session when it cannot fulfill User Plane Security Enforcement information with a value of Required. In this case the SMF releases the PDU session. The NG-RAN notifies the SMF when it cannot fulfill a User Plane Security Enforcement with a value of Preferred.

15. AMF to SMF: Nsmf_PDUSession_UpdateSMContext Request (N2 SM information, Request Type).

The AMF forwards the N2 SM information received from (R)AN to the SMF.

If the list of rejected QFI(s) is included in N2 SM information, the SMF shall release the rejected QFI(s) associated QoS profiles.

If the User Plane Enforcement Policy Notification in the N2 SM information indicates that no user plane resources could be established, and the User Plane Enforcement Policy indicated "required" as described in clause 5.10.3 of TS 23.501 [2], the SMF shall release the PDU session.

16a. The SMF initiates an N4 Session Modification procedure with the UPF. The SMF provides AN Tunnel Info to the UPF as well as the corresponding forwarding rules.

NOTE 7: If the PDU Session Establishment Request was due to mobility between 3GPP and non-3GPP access or mobility from EPC, the downlink data path is switched towards the target access in this step.

16b. The UPF provides an N4 Session Modification Response to the SMF.

If multiple UPFs are used in the PDU Session, the UPF in step 16 refers to the UPF terminating N3.

After this step, the UPF delivers any down-link packets to the UE that may have been buffered for this PDU Session.

17. SMF to AMF: Nsmf_PDUSession_UpdateSMContext Response (Cause).

The SMF may subscribe to the UE mobility event notification from the AMF (e.g. location reporting, UE moving into or out of Area Of Interest), after this step by invoking Namf_EventExposure_Subscribe service operation as specified in clause 5.2.2.3.2. For LADN, the SMF subscribes to the UE moving into or out of LADN service area event notification by providing the LADN DNN as an indicator for the Area Of Interest (see clause 5.6.5 and 5.6.11 of TS 23.501 [2]).

After this step, the AMF forwards relevant events subscribed by the SMF.

18. [Conditional] SMF to AMF: Nsmf_PDUSession_SMContextStatusNotify (Release)

If during the procedure, any time after step 5, the PDU Session establishment is not successful, the SMF informs the AMF by invoking Nsmf_PDUSession_SMContextStatusNotify (Release). The SMF also releases any N4 session(s) created, any PDU Session address if allocated (e.g. IP address) and releases the association with PCF, if any.

19. SMF to UE, via UPF: In case of PDU Session Type IPv6 or IPv4v6, the SMF generates an IPv6 Router Advertisement and sends it to the UE via N4 and the UPF.

20. If the PDU Session establishment failed after step 4, the SMF shall perform the following:

a) The SMF unsubscribes to the modifications of Session Management Subscription data for the corresponding (SUPI, DNN, S-NSSAI), using Nudm_SDM_Unsubscribe (SUPI, Session Management Subscription data, DNN, S-NSSAI), if the SMF is no more handling a PDU Session of the UE for this (DNN, S-NSSAI). The UDM may unsubscribe to the modification notification from UDR by Nudr_DM_Unsubscribe (SUPI, Subscription Data, Session Management Subscription data, S-NSSAI, DNN).

b) The SMF deregisters for the given PDU Session using Nudm_UECM_Deregistration (SUPI, DNN, PDU Session ID). The UDM may update corresponding UE context by Nudr_DM_Update (SUPI, Subscription Data, UE context in SMF data).

** NEXT CHANGE **

4.3.2.2.2  Home-routed Roaming

This procedure is used in case of home-routed roaming scenarios.

Figure 14:
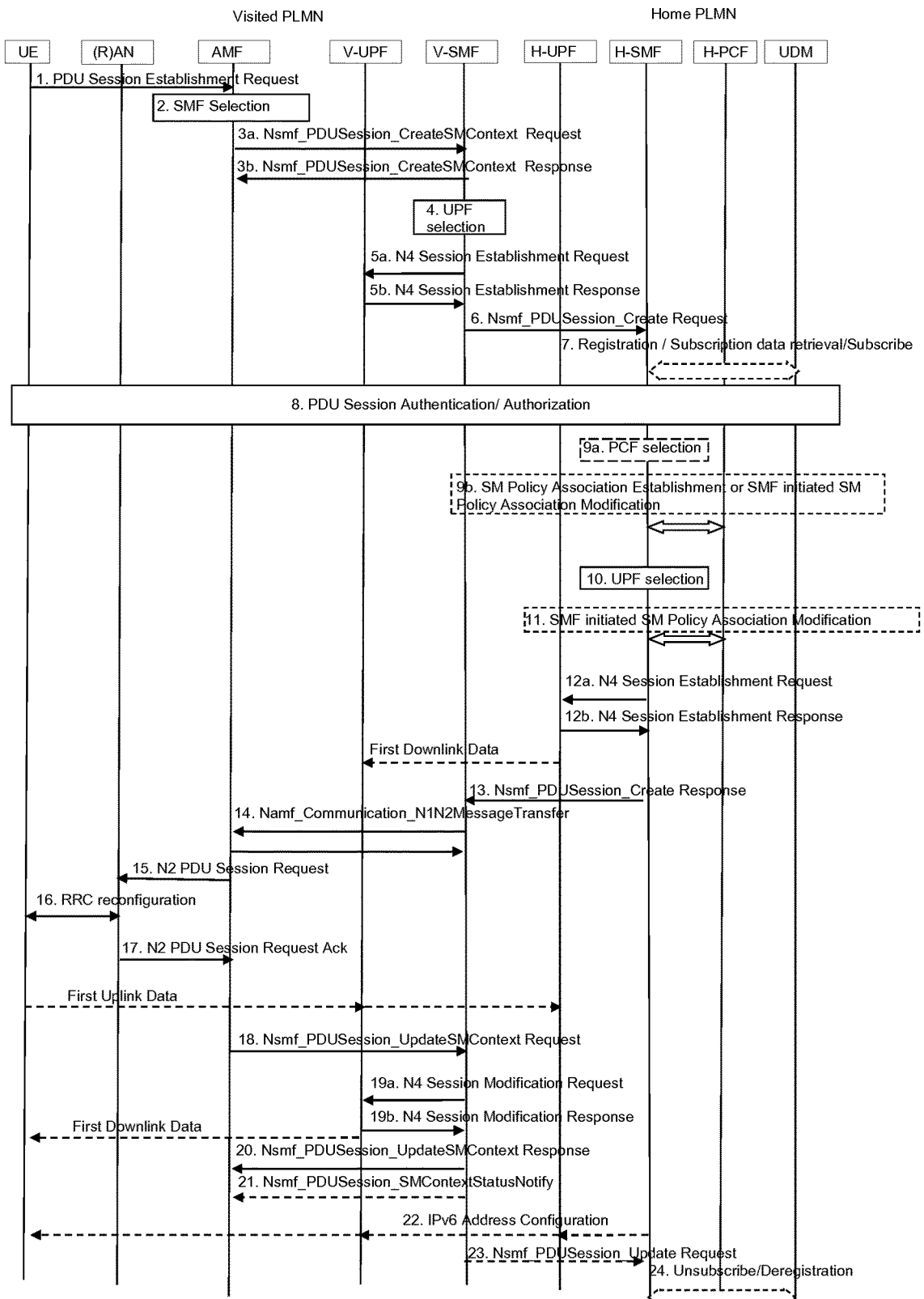
FIG. 14 is a reproduction of FIG. 4.3.2.2.2-1 from 3GPP TS 23.502 V15.4.1.

See Figure 14.

Figure 4.3.2.2.2-1: UE-requested PDU Session Establishment for home-routed roaming scenarios 1. This step is the same as step 1 in clause 4.3.2.2.1.

2. As in step 2 of clause 4.3.2.2.1 with the addition that the AMF also selects an SMF in HPLMN using the S-NSSAI with the value defined by the HPLMN, as described in clause 4.3.2.2.3. The AMF may also receive alternative H-SMFs from the NRF. When the PDU Session is enabled for Control Plane CIoT 5GS Optimisation, the AMF selects home V-SMF and H-SMF that supports the Control Plane CIoT 5GS Optimisation. The AMF stores the association of the S-NSSAI, the DNN, the PDU Session ID, the SMF ID in VPLMN as well as Access Type of the PDU Session.

In step 3 of clause 4.3.2.2.1, in local breakout roaming case, if V-SMF responds to AMF indicating that V-SMF is not able to process some part of the N1 SM information, the AMF proceeds with home routed case from this step and may select an SMF in the VPLMN different from the V-SMF selected earlier.

3a. As in step 3 of clause 4.3.2.2.1 with the addition that:

- the AMF also provides the identity of the H-SMF it has selected in step 2 and both the S-NSSAI from the Allowed NSSAI and the corresponding Subscribed S-NSSAI. The H-SMF is provided when the PDU Session is home-routed. The AMF may also provide the identity of alternative H-SMFs, if it has received in step 2.

- The V-SMF does not use DNN Selection Mode received from the AMF but relays this information to the H-SMF.

The AMF may include the H-PCF ID in this step and V-SMF will pass it to the H-SMF in step 6. This will enable the H-SMF to select the same H-PCF in step 9a.

In case of Unstructured PDU Session Type, the AMF checks whether the UE's subscription includes an "Invoke NEF Selection" flag for the DNN/S-NSSAI combination. If so, the AMF includes the 'Invoke NIDD API Indication' and steps 4 and 5 are skipped.

3b. This step is the same as step 5 of clause 4.3.2.2.1.

4. The V-SMF selects a UPF in VPLMN as described in TS 23.501 [2], clause 6.3.3.

5. The V-SMF initiates an N4 Session Establishment procedure with the selected V-UPF:

5a. The V-SMF sends an N4 Session Establishment Request to the V-UPF. If CN Tunnel Info is allocated by the SMF, the CN Tunnel Info is provided to V-UPF in this step.

5b. The V-UPF acknowledges by sending an N4 Session Establishment Response. If CN Tunnel Info is allocated by the V-UPF, the CN Tunnel Info is provided to V-SMF in this step.

6. V-SMF to H-SMF: Nsmf_PDUSession_Create Request (SUPI, GPSI (if available), DNN, S-NSSAI with the value defined by the HPLMN, PDU Session ID, V-SMF ID, V-CN-Tunnel-Info, PDU Session Type, PCO, Number Of Packet Filters, User location information, Access Type, PCF ID, SM PDU DN Request Container, DNN Selection Mode, Control Plane data delivery Indication, [Always-on PDU Session Requested]). Protocol Configuration Options may contain information that H-SMF may needs to properly establish the PDU Session (e.g. SSC mode or SM PDU DN Request Container to be used to authenticate the UE by the DN-AAA as defined in clause 4.3.2.3). The H-SMF may use DNN Selection Mode when deciding whether to accept or reject the UE request. If the V-SMF does not receive any response from the H-SMF due to communication failure on the N16 interface, depending on operator policy the V-SMF may create the PDU Session to one of the alternative H-SMF(s) if additional H-SMF information is provided in step 3a, as specified in detail in TS 29.502 [36]. The Control Plane data delivery Indication is set by the V-SMF, if the PDU Session is intended for control plane data delivery.

7-12. These steps are the same as steps 4-10 in clause 4.3.2.2.1 with the following differences:

- These steps are executed in Home PLMN;

- The H-SMF stores an association of the PDU Session and V-SMF ID for this PDU Session for this UE.

- The H-SMF does not provides the Inactivity Timer to the H-UPF as described in step 9a in clause 4.3.2.2.1.

- The H-SMF registers for the PDU Session ID with the UDM using Nudm_UECM_Registration (SUPI, DNN, S-NSSAI with the value defined by the HPLMN, PDU Session ID).

- Step 5 of clause 4.3.2.2.1 is not executed.

When PCF is deployed, the SMF shall further report the PS Data Off status to PCF if the PS Data Off event trigger is provisioned, the additional behaviour of SMF and PCF for 3GPP PS Data Off is defined in TS 23.503 [20].

13. H-SMF to V-SMF: Nsmf_PDUSession_Create Response (QoS Rule(s), QoS Flow level QoS parameters if needed for the QoS Flow(s) associated with the QoS rule(s), PCO including session level information that the V-SMF is not expected to understand, selected PDU Session Type and SSC mode, H-CN Tunnel Info, QFI(s), QoS profile(s), Session-AMBR, Reflective QoS Timer (if available), information needed by V-SMF in case of EPS interworking such as the PDN Connection Type, User Plane Policy Enforcement)

If the PDU Session being established was requested to be an always-on PDU Session, the H-SMF shall indicate to the V-SMF whether the request is accepted or not via the Always-on PDU Session Granted indication in the response message to V-SMF. If the PDU Session being established was not requested to be an always-on PDU Session but the H-SMF determines that the PDU Session needs to be established as an always-on PDU Session, the H-SMF shall indicate it to the V-SMF by including Always-on PDU Session Granted indication that the PDU Session is an always-on PDU Session.

The information that the H-SMF may provide is the same than defined for step 11 of Figure 4.3.2.2.1-1.

The H-CN Tunnel Info contains the tunnel information for uplink traffic towards H-UPF.

Multiple QoS Rules and QoS Flow level QoS parameters for the QoS Flow(s) associated with the QoS rule(s) may be included in the Nsmf_PDUSession_Create Response.

In case the PDU Session is enabled for Control Plane CIoT 5GS Optimisation, certain information, e.g. H-CN tunnel info, is not provided in the response to V-SMF.

14-18. These steps are the same as steps 11-15 in clause 4.3.2.2.1 with the following differences:

- These steps are executed in Visited PLMN;

- The V-SMF stores an association of the PDU Session and H-SMF ID for this PDU Session for this UE;

- If the H-SMF indicates the PDU Session can be established as an always-on PDU Session, the V-SMF shall further check whether the PDU Session can be established as an always-on PDU Session based on local policies. The V-SMF notifies the UE whether the PDU Session is an always-on PDU Session or not via the Always-on PDU Session Granted indication in the PDU Session Establishment Accept message.

- In case the PDU Session is enabled for Control Plane CIoT 5GS Optimisation, step 19 and 24 below are omitted.

19a. The V-SMF initiates an N4 Session Modification procedure with the V-UPF. The V-SMF provides Packet detection, enforcement and reporting rules to be installed on the V-UPF for this PDU Session, including AN Tunnel Info, H-CN Tunnel Info and V-CN Tunnel Info.

19b. The V-UPF provides a N4 Session Modification Response to the V-SMF.

After this step, the V-UPF delivers any down-link packets to the UE that may have been buffered for this PDU Session.

20. This step is the same as step 17 in clause 4.3.2.2.1 with the following differences:

- The SMF is a V-SMF

21. This step is same as step 18 in clause 4.3.2.2.1.

22. H-SMF to UE, via H-UPF and V-UPF in VPLMN: In case of PDU Session Type IPv6 or IPv4v6, the H-SMF generates an IPv6 Router Advertisement and sends it to the UE via N4 and the H-UPF and V-UPF.

23. If the V-SMF received in step18 an indication that the (R)AN has rejected some QFI(s) the V-SMF notifies the H-SMF via a Nsmf_PDUSession_Update Request. The H-SMF is responsible of updating accordingly the QoS rules and QoS Flow level QoS parameters if needed for the QoS Flow(s) associated with the QoS rule(s) in the UE.

24. This step is the same as step 20 in clause 4.3.2.2.1 with the difference that this step is executed in the Home PLMN.

NOTE: The SMF in HPLMN can initiate step 21 already after step 13.

** NEXT CHANGE **

4.x  Procedures of small data transfer via NAS and N6

4.x.1  UPF anchored Mobile Originated Data Transport in Control Plane CIoT 5GS Optimisation This clause describes the procedures for Mobile Originated Transport in Control Plane CIoT 5GS Optimisation where the PDU Session is terminated at a UPF.

Figure 15:
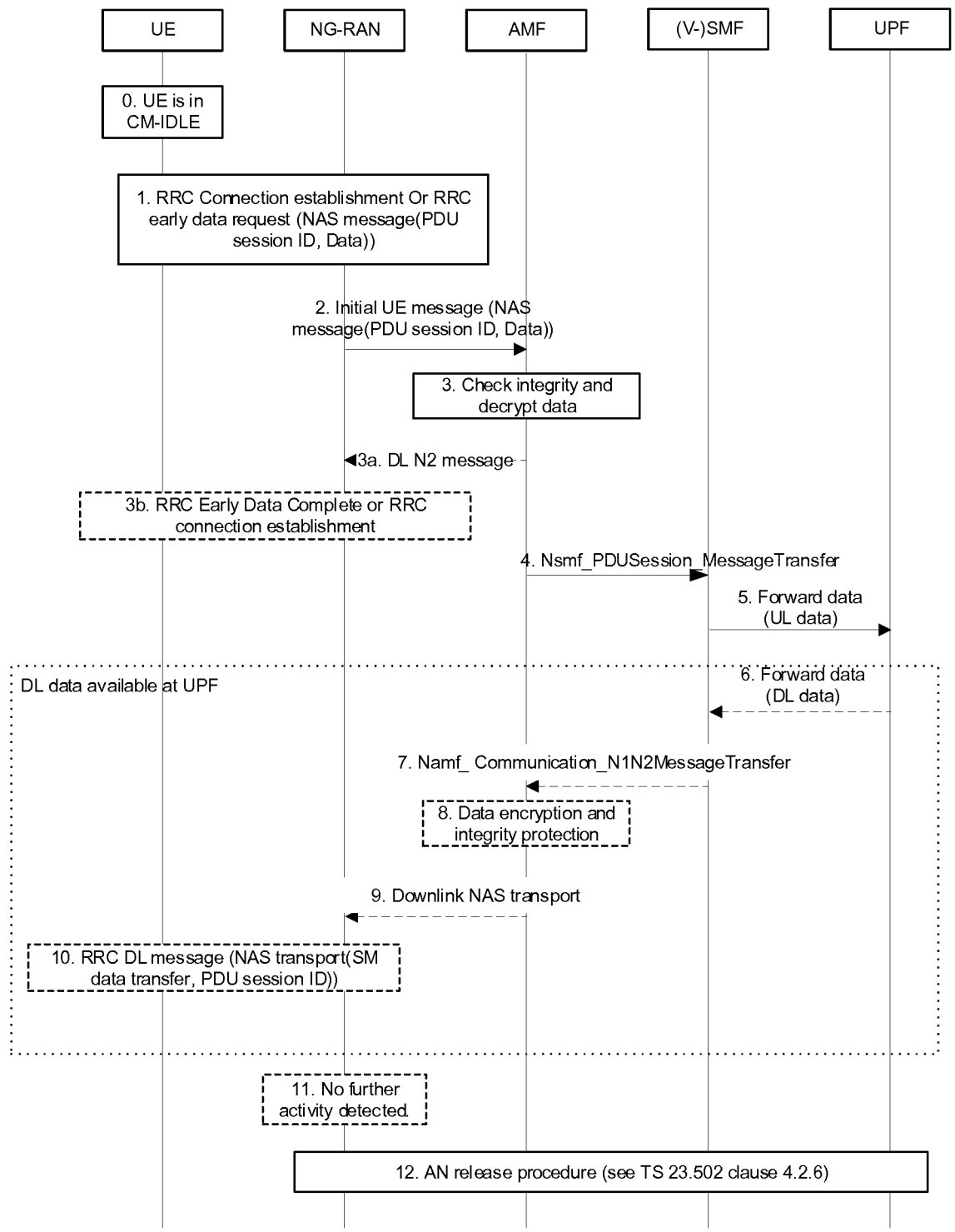
FIG. 15 is a reproduction of FIG. 4.x.1-1 from 3GPP TS 23.502 V15.4.1.

See Figure 15.

Figure 4.x.1-1: UPF anchored Mobile Originated Data Transport in Control Plane CIoT 5GS Optimisation

0. The UE is in CM-IDLE.

Editor's Note: the case of the UE in CM-CONNECTED is FFS.

Editor's Note: How to handle the case of RAI with single UL/single DL packet only is FFS.

1. The UE establishes an RRC connection or sends the RRCEarlyDataRequest message and sends a NAS message as part of this. The NAS message carries the ciphered PDU session ID and ciphered uplink data as payload.

The UE may also send AS Release Assistance Information (AS RAI) to NG-RAN or NAS Release Assistance Indication (NAS RAI) included in the NAS message. AS or NAS RAI indicates whether no further Uplink or Downlink Data transmissions are expected, or only a single Downlink data transmission (e.g. Acknowledgement or response to Uplink data) subsequent to this Uplink Data transmission is expected.

2. NG-RAN forwards the NAS message to the AMF. If RRCEarlyDataRequest message was received in step 1, the NG-RAN includes "EDT Session" indication in the N2 Initial UE message. In case of AS RAI indicating no further uplink or downlink data expected, the NG-RAN further indicates request to release RRC connection in N2 Initial UE message.

3. AMF checks the integrity of the incoming NAS message and deciphers the PDU session ID and uplink data.

3a. If the AMF received "EDT Session" indication from the NG-RAN in step 2, the AMF sends an N2 message to the NG-RAN.

a) In case of NAS RAI with Uplink data and it indicated that Downlink data was not expected or if the AMF received a request to release RRC connection in N2 Initial UE message in case of AS RAI, and the AMF does not expect any other signalling with the UE, the AMF should

- either send a NAS service accept in the N2 Downlink NAS message and include End Indication to indicate that no further data or signalling is expected with the UE; or,

- alternatively, instead of a NAS service accept, the AMF sends an N2 Connection Establishment Indication message including End Indication to indicate that no further data or signalling is expected with the UE.

b) If the AMF determines more data or signalling may be pending, the AMF sends an N2 connection establishment indication message without End Indication.

3b. In case 3a was executed, the NG-RAN completes the RRC early data procedure as follows.

a) For the case of 3a.a) the NG-RAN proceeds with RRCEarlyDataComplete message. The procedure is completed in Step 5.

b) For the case of 3a.b) the NG-RAN proceeds with RRC connection establishment procedure. In that case all steps up to step 12 apply.

4. AMF determines the (V-)SMF handling the PDU session based on the PDU session ID contained in the NAS message and passes the PDU Session ID and the data to the (V-)SMF by invoking the XXX service operation.

Editor's Note: Whether the existing UpdateSMContext service operation or a new service operation is used is pending CT4 discussion.

5. The (V-)SMF decompresses the header if header compression applies to the PDU session. The V-SMF forwards the data to the UPF. (In the home-routed roaming case, the UPF may forward the data to a different UPF in the HPLMN via N9.) The UPF forwards the data to the DN based on data forwarding rule, e.g., in case of unstructured data, tunneling may be applied according to clause 5.6.10.3 in TS 23.501 [5].

6. [Conditional] The UPF forwards available downlink data to the (V-)SMF,

7. [Conditional] The (V-)SMF compresses the header if header compression applies to the PDU session. The (V-)SMF forwards the downlink data and the PDU session ID to the AMF using the Namf_Communication_N1N2MessageTransfer service operation.

8. [Conditional] The AMF creates a DL NAS transport message with the PDU session ID and the downlink data. The AMF ciphers and integrity protects the NAS transport message 9. [Conditional] The AMF sends the DL NAS transport message to NG-RAN.

10. [Conditional] NG-RAN delivers the NAS payload over RRC to the UE.

11. [Conditional] If no further activity is detected by NG-RAN, then NG-RAN triggers the AN release procedure.

12. The UE's logical NG-AP signaling connection and RRC signaling connection are released as per TS 23.502 [7] clause 4.2.6.

NOTE 3: The details of the NGAP messages to be used for this procedure are to be decided by RAN WG3.

4.x.2 UPF anchored Mobile Terminated Data Transport in Control Plane CIoT 5GS Optimisation This clause describes the procedures for Mobile Terminated Data Transport in Control Plane CIoT 5GS Optimisation where the PDU Session is terminated at a UPF.

Figure 16:
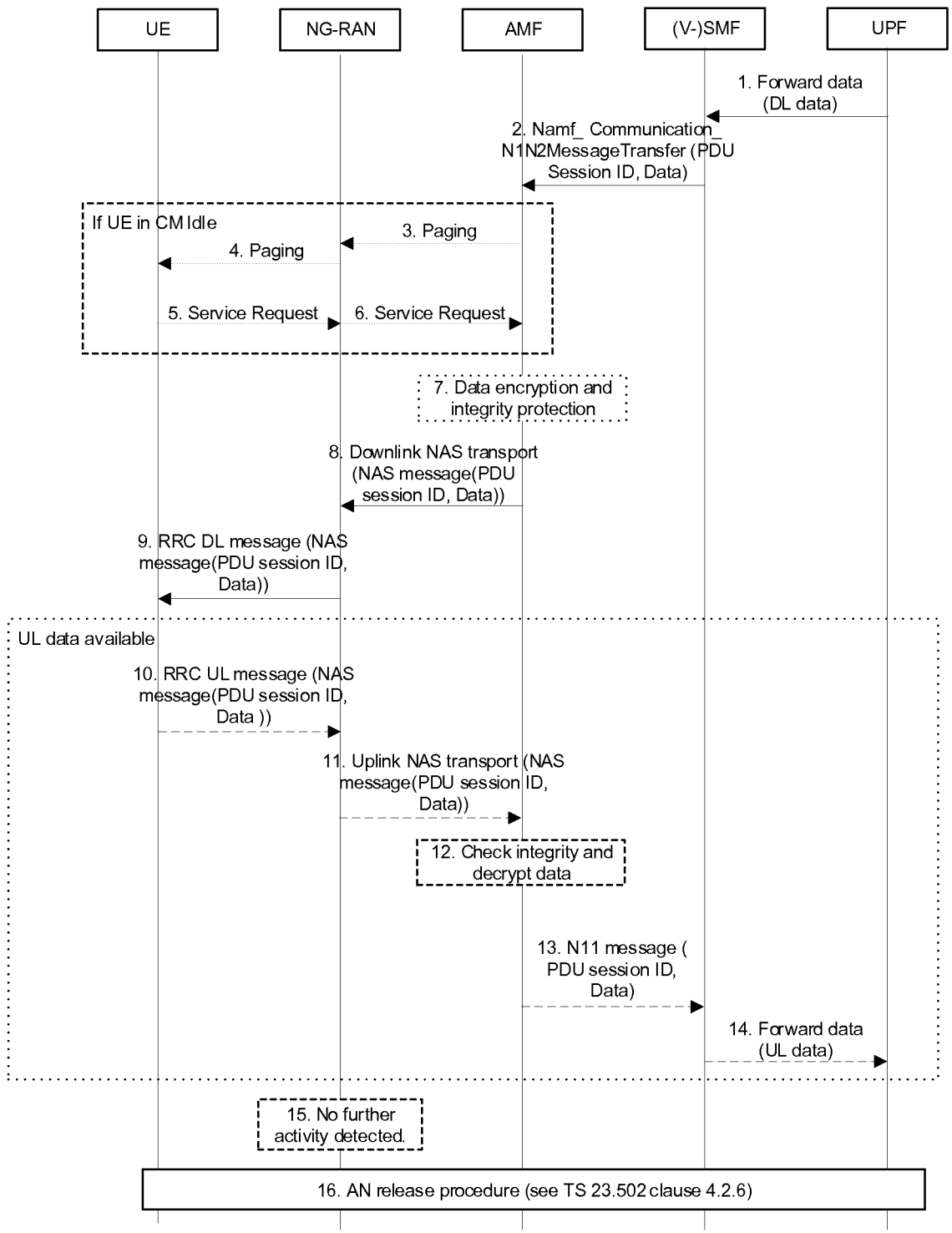
FIG. 16 is a reproduction of FIG. 4.x.2-1 from 3GPP TS 23.502 V15.4.1.

See Figure 16.

Figure 4.x.2-1: Mobile Terminated Data Transport in Control Plane CIoT 5GS Optimisation

1. The UPF forwards a downlink data packet to the SMF.

2. The (V-)SMF compresses the header if header compression applies to the PDU session and encapsulates the downlink data as payload in a NAS message. The (V-)SMF forwards the NAS message and the PDU session ID to the AMF using the Namf_Communication_N1N2MessageTransfer service operation.

3. [Conditional] If the UE is in CM Idle, the AMF sends a paging message to NG-RAN.

4. [Conditional] If NG-RAN received a paging message from AMF, NG-RAN perform paging.

5, 6. [Conditional] If the UE receives paging message, it responds with service request (see step 6 of clause 4.2.3.3) without including the PDU Session Status in the Service Request message.

7. The AMF creates a DL NAS transport message with the PDU session ID and the NAS message received from the SMF. The AMF ciphers and integrity protects the NAS transport message 8. The AMF sends the DL NAS transport message to NG-RAN.

9. NG-RAN delivers the NAS payload over RRC to the UE.

10. While the RRC connection is established further uplink and downlink data can be exchanged. In order to send uplink data, the UE sends a NAS message carrying the ciphered PDU session ID and ciphered uplink data.

11. NG-RAN forwards the NAS message to the AMF.

12. AMF checks the integrity of the incoming NAS message and deciphers the PDU session ID and uplink data.

13. AMF determines the (V-)SMF handling the PDU session based on the PDU session ID contained in the NAS transport message and forwards the data to the (V-)SMF.

Editor's Note: Whether the existing UpdateSMContext service operation or a new service operation is used is pending CT4 discussion.

14. The (V-)SMF decompresses the header if header compression applies to the PDU session. The (V-)SMF forwards the data to the UPF. (In the home-routed roaming case, the UPF may forward the data to a different UPF in the HPLMN via N9.) The UPF forwards the data to the DN based on data forwarding rule, e.g., in case of unstructured data, tunneling may be applied according to clause 5.6.10.3 in TS 23.501 [5].

15. [Conditional] If no further activity is detected by NG-RAN, then NG-RAN triggers the AN release procedure.

16. The UE's logical NG-AP signaling connection and RRC signaling connection are released according to TS 23.502 [7] clause 4.2.6.

NOTE 2: How the UE is released based on Release Assistance Information is covered in clause 6.1.2.

NOTE 3: The details of the NGAP messages to be used for this procedure are to be decided by RAN WG3.

** NEXT CHANGE **

*5.2.3.3 Nudm_SubscriberDataManagement (SDM) Service*

5.2.3.3.1 General

Subscription data types used in the Nudm_SubscriberDataManagement Service are defined in Table 5.2.3.3.1-1 below.

Table 5.2.3.3.1-1: UE Subscription data types

| Subscription data type | Field | Description |
| --- | --- | --- |
| Access and Mobility Subscription data (data needed for UE Registration and Mobility Management) | GPSI List | List of the GPSI (Generic Public Subscription Identifier) used both inside and outside of the 3GPP system to address a 3GPP subscription. |
| | Internal Group ID-list | List of the subscribed internal group(s) that the UE belongs to. |
| | Subscribed-UE-AMBR | The Maximum Aggregated uplink and downlink MBRs to be shared across all Non-GBR QoS Flows according to the subscription of the user. |
| | Subscribed S-NSSAIs | The Network Slices that the UE subscribes to. In the roaming case, it indicates the subscribed Network Slices applicable to the Serving PLMN. |
| | Default S-NSSAIs | The Subscribed S-NSSAIs marked as default S-NSSAI. In the roaming case, only those applicable to the Serving PLMN. |
| | UE Usage Type | As defined in TS 23.501 [2], clause 5.15.7.2. |
| | RAT restriction | 3GPP Radio Access Technology(ies) not allowed the UE to access. |
| | Forbidden area | Defines areas in which the UE is not permitted to initiate any communication with the network. |
| | Service Area Restriction | Indicates Allowed areas in which the UE is permitted to initiate communication with the network, and Non-allowed areas in which the UE and the network are not allowed to initiate Service Request or SM signalling to obtain user services. |
| | Core Network type restriction | Defines whether UE is allowed to connect to 5GC and/or EPC for this PLMN. |
| | RFSP Index | An index to specific RRM configuration in the NG-RAN. |
| | Subscribed Periodic Registration Timer | Indicates a subscribed Periodic Registration Timer value. |
| | Priority Services | Indicates the user is subscribed to priority service (MPS) as indicated in TS 23.501 [2], clause 5.16.5. |
| | UE behavioural information / Communication patterns | Information on expected UE movement and communication characteristics. See clause 4.15.6.2 |
| | Steering of Roaming | List of preferred PLMN/access technology combinations or HPLMN indication that no change of the "Operator Controlled PLMN Selector with Access Technology" list stored in the UE is needed (see NOTE 3).<br>Optionally includes an indication that the UDM requests an acknowledgement of the reception of this information from the UE. |
| | Network Slicing Subcription Change Indicator | When present, indicates to the serving AMF that the subscription data for network slicing changed and the UE configuration must be updated. |
| | Tracing Requirements | Trace requirements about a UE (e.g. trace reference, address of the Trace Collection Entity, etc.) is defined in TS 32.421 [39].<br>This information is only sent to AMF in the HPLMN or one of its equivalent PLMN(s). |
| Slice Selection Subscription data (data needed for Slice Selection as descreted in clause 4.2.2.2.3) | Subscribed S-NSSAIs | The Network Slices that the UE subscribes to. In roaming case, it indicates the subscribed network slices applicable to the serving PLMN. |

| UE context in AMF data | AMF | Allocated AMF for the registered UE. Include AMF address and AMF NF Id. |
|---|---|---|
| | Access Type | 3GPP or non-3GPP access through this AMF |
| | Homogenous Support of IMS Voice over PS Sessions for AMF | Indicates per UE and AMF if "IMS Voice over PS Sessions" is homogeneously supported in all TAs in the serving AMF or homogeneously not supported, or, support is non-homogeneous/unknown, see clause 5.16.3.3 of TS 23.501 [2]. |
| SMF Selection Subscription data (data needed for SMF Selection as described in clause 6.3.2 of TS 23.501 [2]) | SUPI | Key |
| | SMF Selection Subscription data contains one or more S-NSSAI level subscription data: | |
| | S-NSSAI | Indicates the value of the S-NSSAI. |
| | Subscribed DNN list | List of the subscribed DNNs for the UE (NOTE 1). |
| | Default DNN | The default DNN if the UE does not provide a DNN (NOTE 2). |
| | LBO Roaming Information | Indicates whether LBO roaming is allowed per DNN, or per (S-NSSAI, subscribed DNN) |
| | Interworking with EPS indication list | Indicates for which DNN from the Subscribed DNN list interworking is supported. |
| UE context in SMF data | SUPI | Key |
| | PDU Session Id(s) | List of PDU Session Id(s) for the UE |
| | For each PDU Session Id: | |
| | DNN | DNN for the PDU Session. |
| | SMF | Allocated SMF for the PDU Session. Includes SMF IP Address and SMF NF Id. |
| SMS Management Subscription data (data needed by SMSF for SMSF Registration) | SMS parameters | Indicates SMS parameters subscribed for SMS service such as SMS teleservice, SMS barring list |
| | Trace Requirements | Trace requirements about a UE (e.g. trace reference, address of the Trace Collection Entity, etc.) is defined in TS 32.421 [39]. This information is only sent to a SMSF in HPLMN. |
| SMS Subscription data (data needed in AMF) | SMS Subscription | Indicates subscription to any SMS delivery service over NAS irrespective of access type. |
| UE Context in SMSF data | SMSF Information | Indicates SMSF allocated for the UE, including SMSF address and SMSF NF ID. |
| | Access Type | 3GPP or non-3GPP access through this SMSF |
| Session Management Subscription data (data needed for PDU Session Establishment) | GPSI List | List of the GPSI (Generic Public Subscription Identifier) used both inside and outside of the 3GPP system to address a 3GPP subscription. |
| | Internal Group ID-list | List of the subscribed internal group(s) that the UE belongs to. |
| | Trace Requirements | Trace requirements about a UE (e.g. trace reference, address of the Trace Collection Entity, etc...) is defined in TS 32.421 [39]. This information is only sent to a SMF in the HPLMN or one of its equivalent PLMN(s). |
| | Session Management Subscription data contains one or more S-NSSAI level subscription data: | |
| | S-NSSAI | Indicates the value of the S-NSSAI. |
| | Subscribed DNN list | List of the subscribed DNNs for the S-NSSAI (NOTE 1). |
| | For each DNN in S-NSSAI level subscription data: | |
| | DNN | DNN for the PDU Session. |

| | UE Address | Indicates the subscribed static IP address(es) for the IPv4 or IPv6 or IPv4v6 type PDU Sessions accessing the DNN, S-NSSAI. |
|---|---|---|
| | Allowed PDU Session Types | Indicates the allowed PDU Session Types (IPv4, IPv6, IPv4v6, Ethernet, and Unstructured) for the DNN, S-NSSAI. |
| | Default PDU Session Type | Indicates the default PDU Session Type for the DNN, S-NSSAI. |
| | Allowed SSC modes | Indicates the allowed SSC modes for the DNN, S-NSSAI. |
| | Default SSC mode | Indicate the default SSC mode for the DNN, S-NSSAI. |
| | Interworking with EPS indication | Indicates whether interworking with EPS is supported for this DNN and S-NSSAI. |
| | 5GS Subscribed QoS profile | The QoS Flow level QoS parameter values (5QI and ARP) for the DNN, S-NSSAI (see clause 5.7.2.7 of TS 23.501 [2]). |
| | Charging Characteristics | This information is defined in TS 32.240 [34]; it may e.g. contain information on how to contact the Charging Function. This information, when provided shall override any corresponding predefined information at the SMF |
| | Subscribed-Session-AMBR | The maximum aggregated uplink and downlink MBRs to be shared across all Non-GBR QoS Flows in each PDU Session, which are established for the DNN, S-NSSAI. |
| | Static IP address/prefix | Indicate the static IP address/prefix for the DNN, S-NSSAI. |
| | User Plane Security Policy | Indicates the security policy for integrity protection and encryption for the user plane. |
| | Invoke NIDD API indication | Indicates, per S-NSSAI and per DNN, whether or not the NIDD API shall be invoked for a PDU session. |
| | Invoke NEF Selection indication | When present, indicates, per S-NSSAI and per DNN, the NEF Identity for PDU Session anchor in case of NEF based infrequent small data transfer via NAS. |
| | NIDD information | Iformation such as External Group Identifier, External Identifier, MSISDN, or AF ID used for SMF-NEF Connection. |
| Identifier translation | SUPI | Corresponding SUPI for input GPSI |
| | (Optional) MSISDN | Corresponding GPSI (MSISDN) for input GPSI (External Identifier). This is optionally provided for legacy SMS infrastructure not supporting MSISDN-less SMS. The presence of an MSISDN should be interpreted as an indication to the NEF that MSISDN shall be used to identify the UE when sending the SMS to the SMS-SC via T4. |
| Intersystem continuity Context | (DNN, PGW FQDN) list | For each DNN, indicates the PGW-C+SMF which support interworking with EPC. |
| NOTE 1: The Subscribed DNN list can include a wildcard DNN. | | |
| NOTE 2: The default DNN shall not be a wildcard DNN. | | |
| NOTE 3: The Steering of Roaming information is protected using the mechanisms defined in TS 33.501 [15]. | | |

** END OF CHANGES **

The invention claimed is:

1. A method performed by a Visited Session Management Function, V-SMF, in a core network of a cellular communications system to enable Data over Non-Access Stratum, DoNAS, data delivery in a roaming scenario, the method comprising:

sending from the V-SMF to a Home Session Management Function, H-SMF, a Packet Data Unit, PDU, session create request during PDU session establishment for DoNAS data delivery for a User Equipment, UE, wherein the PDU session create request comprises an indication that a control plane interface between the V-SMF and the H-SMF can be used for DoNAS data delivery, in a roaming scenario; and receiving a response from the H-SMF, wherein the response from the H-SMF
provides an indication that the control plane interface between the V-SMF and the H-SMF is to be used for a data path for the DoNAS data delivery for the UE, and wherein tunnel information for uplink traffic towards a Home User Plane Function, H-UPF, is not provided in the response.

2. The method of claim 1 further comprising:
prior to sending the PDU session create request to the H-SMF, receiving a create SM context request from an Access and Mobility Management Function, AMF; and
after receiving the response from the H-SMF, sending a create SM context accept message to the AMF.

3. The method of claim 1, further comprising:
receiving a message from the UE comprising a data container comprising user data for the DoNAS data delivery between a Network Exposure Function, NEF, and the UE; and
sending a message to the H-SMF that comprises a data container comprising the user data.

4. The method of claim 1, further comprising:
receiving a message from the H-SMF comprising a data container comprising user data for the DoNAS data delivery; and
sending a message from the V-SMF to the UE comprising a data container comprising the user data.

5. The method of claim 1, wherein the DoNAS data delivery is via an extension to an existing Session Management Function, SMF, service operation.

6. The method of claim 1, wherein the DoNAS data delivery is via the following data path:

UE↔V-SMF↔H-SMF↔NEF↔Application Function (AF)/Service Capability Server (SCS)/Access Stratum (AS).

7. A core network entity adapted to perform the method of claim 1.

8. A method performed by a Home Session Management Function, H-SMF, in a core network of a cellular communications system to enable Data over Non-Access Stratum, DoNAS, data delivery in a roaming scenario, the method comprising:

receiving from a Visited Session Management Function, V-SMF, a Packet Data Unit, PDU, session create request during PDU session establishment for DoNAS data delivery for a User Equipment, UE, wherein the PDU session create request comprises an indication that a control plane interface between the V-SMF and the H-SMF can be used for DoNAS data delivery;

deciding whether to use the control plane interface between the V-SMF and the H-SMF for the DoNAS data delivery, or to use a user plane interface between a Visited User Plane Function, V-UPF, and a Home User Plane Function, H-UPF, for the DoNAS data delivery for the UE;

wherein if it is decided that the control plane interface is to be used for DoNAS data delivery;

sending a response to the V-SMF, wherein the response provides an indication that the control plane interface between the V-SMF and the H-SMF is to be used for a data path for the DoNAS data delivery for the UE, and wherein tunnel information for uplink traffic towards a Home User Plane Function, H-UPF, is not provided in the response.

9. The method of claim 8, further comprising:
receiving a message from a Network Exposure Function, NEF, comprising a data container comprising user data for the DoNAS data delivery between the NEF and the UE; and
sending a message to the V-SMF that comprises a data container comprising the user data.

10. The method of claim 8, further comprising:
receiving a message from the V-SMF comprising a data container comprising user data for the DoNAS data delivery; and
sending a message from the H-SMF to a Network Exposure Function, NEF, comprising a data container comprising the user data.

* * * * *